United States Patent [19]

Sommer

[11] 4,172,443
[45] Oct. 30, 1979

[54] CENTRAL RECEIVER SOLAR COLLECTOR USING ANALOG COUPLING MIRROR CONTROL

[76] Inventor: Warren T. Sommer, 2608 N. Humboldt Blvd., Milwaukee, Wis. 53212

[21] Appl. No.: 911,228

[22] Filed: May 31, 1978

[51] Int. Cl.² .......................... F24J 3/02; G02B 5/08; G03B 21/00
[52] U.S. Cl. .................................. 126/451; 126/438; 350/299; 353/3
[58] Field of Search .................... 126/270, 271; 74/25; 237/1 A; 350/299; 353/3, 289; 250/203 R

[56] References Cited

U.S. PATENT DOCUMENTS

| | | | |
|---|---|---|---|
| 1,111,239 | 9/1914 | Smelser | 126/270 |
| 2,712,772 | 7/1955 | Trombe | 126/270 X |
| 3,466,119 | 9/1969 | Francia | 126/270 X |
| 3,905,352 | 9/1975 | Jahn | 126/270 |
| 3,917,942 | 11/1975 | McCay | 126/270 X |
| 4,056,313 | 11/1977 | Arbogast | 11/77 |
| 4,063,543 | 12/1977 | Hedger | 126/270 |
| 4,082,947 | 4/1978 | Haywood et al. | 126/270 X |
| 4,102,326 | 7/1978 | Sommer | 126/270 |
| 4,117,682 | 10/1978 | Smith | 126/270 X |

FOREIGN PATENT DOCUMENTS

| | | | |
|---|---|---|---|
| 982906 | 2/1951 | France | 353/3 |
| 449771 | 6/1949 | Italy | 353/3 |

*Primary Examiner*—Samuel Scott
*Assistant Examiner*—Randall L. Green

[57] ABSTRACT

A solar collector having a central radiation receiver and a plurality of mirrors mounted on articulated mounting structures arranged over a surface in an array pattern comprised of discrete paths, with the path shapes having certain prescribed symmetry properties. Using mathematical properties of tilt angle components expressed relative to fixed orthogonal axes of resolution for mirrors oriented to reflect solar radiation onto the radiation receiver, mirror control is accomplished by the use of coupling devices which extend along the discrete mirror containing paths. Each coupling device comprises a passive linear series system having an appropriate gradient of component values. The types of linear series coupling devices specifically considered in the disclosure are tensile elastic coupling devices and electrically resistive coupling devices for mirror control in large scale collectors, and torsional elastic coupling devices for mirror control in small scale collectors. Direct use of the coupled control information requires the use of unconventional mirror mounts which structurally incorporate the fixed orthogonal axes of resolution as mirror mount axes. The mirrors for large scale collectors are mounted on individual mirror mount structures, and appropriate mirror array patterns may be established on any reasonably smooth terrain. The torsional coupling devices intended for use in small scale collectors are used as structural members in a collective mounting structure for the mirrors as well as serving to couple tilt angle information along the individual coupling devices.

35 Claims, 28 Drawing Figures

CENTRAL RECEIVER SOLAR COLLECTOR USING ANALOG COUPLING MIRROR CONTROL

BACKGROUND OF THE INVENTION

This invention relates to the class of solar collectors known as central receiver collectors, in which a plurality of mirrors reflect solar radiation onto a radiation receiver having dimensions small compared to the dimensions of the mirror field. Various design proposals for central receiver collectors dominate the current effort to achieve practical large scale solar power plants. The design proposals for large scale collectors generally call for independently aimed and actuated heliostats, with control signals coming either from a control computer or from a combination of computer for coarse control and an optical sensor associated with each individual heliostat for fine control.

Previously known collective control systems using linked mirrors, such as described by Francia in U.S. Pat. No. 3,466,119, have been dismissed as impractical for use in large scale collectors. In a more recent U.S. Pat. No. 4,102,326, incorporated herein for reference, there is described a rigid mechanical linkage system for controlling the mirrors of a central receiver collector. However, while the rigid mechanical linkage should be useful for collectors from quite small size up to fairly substantial installations, it also would not be readily adaptable to very large scale collectors.

However, there appears to be the need for some sort of collectivization of the heliostat control for large scale systems. The current design concepts, using independently aimed mirrors, call for either individual mirrors which are as large as could possibly be accommodated by the size of the radiation receiver chosen for the large scale collector, or for groups of mirrors in individual structures of equivalent size. As the amount of structural material required to construct a heliostat of adequate rigidity will vary roughly as the cube of the linear dimensions of the mirror structure, it would be advantageous from the standpoint of material utilization if smaller individual mirror structures could be made economically practical. A further advantage which would appear to be inherent in the use of a larger number of individually smaller heliostats than are called for in the existing central receiver concept proposals is that manufacturing economies of scale could be more readily obtained. However, for the advantages which appear to be associated with the use of smaller individual heliostats to be realized, it would apparently be required that an effective collective control system usable in very large scale collectors be developed, in order to reduce the cost for guidance and control of each heliostat.

SUMMARY OF THE INVENTION

This disclosure describes a new type of collective control system for heliostat mirrors based upon the algebraic properties of mirror tilt angles resolved about fixed orthogonal axes. The fundamental equations which underlie the collective control system of the present disclosure are essentially the same as for the rigid linkage system of U.S. Pat. No. 4,102,326. However, the equations are interpreted in a completely different way to arrive at the control system taught here. Also, the nominally exact mirror control system, which may be analytically demonstrated to be allowed by the fundamental equations, provides only the nucleus for the present invention. A very large part of the disclosure is concerned with forms of the control system which are not exact, but which may be demonstrated to have an intrinsic error so low that they can meet the rigid accuracy requirements of a large scale central receiver collector. Fundamental structural variations of the individual heliostats and of the collective control means are allowed by generalizing the invention from the nominally exact form which has an analytical basis to highly precise approximate forms which have a computational basis. So far as can be determined, the mathematical properties which serve as the basis for the general type of control system taught here have not previously been studied, presumably because analytical and computational studies carried out by others have used angular variables corresponding to known types of mirror mounts, rather than the fixed orthogonal axes used here.

In this invention a plurality of mirrors, which are mounted on articulated mounting structures to reflect solar radiation onto a central radiation receiver, are organized into an array pattern consisting of specified mirror containing paths, with the path shapes having certain desired mathematical properties which will be described later. In paths of the desired type, it is possible to represent, to a high degree of precision, the value of at least one tilt angle component, about one of a pair of fixed orthogonal axes, for mirrors at all points along an interval of a path as a fixed linear combination of the values of the tilt angle component at the ends of the interval. Using this mathematical property of the tilt angle components along the desired path shapes, control information is coupled to all mirrors along appropriate intervals of a path by a coupling device which comprises a passive linear series system having an appropriate gradation of component values. The linear series systems which appear to be most readily employed for mirror control, and those which are specifically considered in the disclosure, are electrically resistive components in series and tensile elastic components in series for use in large scale collectors, and torsional elastic components in series for use in small scale collectors. There are other, mathematically equivalent, linear series systems, such as compressive elastic systems using coupled hydraulic actuators, which might also prove to be useful in mirror control systems. Of the mathematically equivalent series systems specifically considered for use with large scale collectors, the electrically resistive coupling devices appear to be the best suited for very long range control. However, electrically resistive coupling devices are limited to use in systems in which the actuators to be controlled are active actuators having independent energy inputs, with the voltage values established by the resistive coupling devices serving as inputs for locally closed loop servo controls for the actuators. Tensile elastic coupling devices, on the other hand, may be used either in a mode in which a heavy duty coupling device is linked to, and provides the motive force for, a mobile part of a simple passive actuator on each mirror mount along an interval of path; or alternatively in a mode in which a lighter duty elastic coupling device is linked to an appropriate control transducer on each mirror mount along an interval of path, with the control transducer controlling the power input to a reversible active actuator in a manner such that a mobile part of the active actuator moves in synchronism with the local motion of the tensile elastic coupling device. The latter arrangement isolates the coupling devices from forces produced by wind acting on the mirrors. The type of control transducer suited for use in combination with a tensile elastic coupling device and an individual active actuator would appear to be simpler and less costly than the position feedback and amplification means required for control of an active actuator by a voltage coupled along a resistive coupling device. The point of view reflected in the disclosure therefore is that the most economical means of controlling relatively small heliostats will probably result from the use of elastic coupling devices, either for direct actuation of the mirrors by coupling through passive actuators, or for controlling active actuators by coupling to control transducers, which may be appropriate types of electrical switching devices, or directional control valves, depending on the type of actuator used. Even assuming that the most economical control of the individual heliostats may be accomplished by elastic coupling devices, however, it is necessary to also consider the components to be used with electrically resistive coupling devices, as the use of voltage coupling, over resistive coupling devices, appears to be the logical way to exert long range control over the elastic coupling system. If high volume production of appropriate position feedback and amplification means should allow these components to be supplied at low cost, then it might become desirable to use voltage controlled actuators on the individual heliostats.

The type of control described above cannot be applied in a direct way to mirrors mounted on any of the conventional types of mirror mounts. The direct use of the quantities coupled by elastic or resistive coupling devices for mirror control requires the use of unconventional mirror mounts having two fixed orthogonal mirror mount axes. In order that a mirror be independently tiltable about two fixed axes, the mount must contain a tiltable structure comprising two mutually rotatable parts. Although the resulting mirror mount structure would presumably not be a preferred type of mount for use in any situation in which collective control was not being considered, the mount does not appear to be so disadvantageous as to preclude consideration of collectively controlled mirrors, using these special mounts, as an alternative to independently controlled mirrors for a large scale collector.

Within the scope of the invention there is also the possibility of using resistive coupling devices for communicating, in the form of voltage values, tilt angle component information relating to fixed orthogonal axes, employed in combination with local transformation circuits which would digitallize the voltages and, in combination, transform the tilt angle data into data usable for controlling a conventional mirror mount. The utility of the coupling devices in such a system would be that, by forming the proper tilt angle information in the form of local voltage values, it would be possible to control the actuators of conventional mirror mounts with low speed transformation circuitry which would be identical for all positions in the mirror array, with no programmable feature required.

A mirror array having appropriate characteristics for using the coupling means taught in this disclosure may be established on any relatively smooth terrain. However, the appropriate characteristics for the path shapes may be most readily defined if all the mirrors are initially assumed to be distributed over a plane surface. If the heliostats are organized into circular paths in a plane, with the point at which a line through the radiation receiver intersects the plane perpendicularly being positioned at the center of the circles, and if each mirror mount is associated with first and second fixed orthogonal axes of resolution lying in the plane, with the first axis for all mounts being parallel and the second axis for all mounts being parallel, then it may be analytically shown that the values of the tangent functions of the tilt angle components about the first and second axes of resolution, for mirrors oriented to reflect radiation from a distant source onto the radiation receiver, a may be represented exactly, for all mirror positions, as fixed linear combinations of the values at a few fixed points on each circular path. For each circular path, the tangent function about a given fixed resolution axes direction may be represented as a fixed linear combination of the values of the function at diametrically opposite points where the circular path intersects a plane which is perpendicular to the fixed resolution axis direction and passes through the radiation receiver (which will initially be regarded as a point target). By knowing the nature of the mathematical expression for representing each tangent function as a linear combination of its values at the two special fixed points, it is possible to design elastic or resistive coupling devices which can couple mechanical displacements or voltage values respectively, which are proportional to the tangent function about a particular resolution axis direction, from the two special fixed points associated with that axis to all points in the circular path. Using unconventional mirror mounts in which the fixed axes of resolution are structurally incorporated into the mirror mount, it is further possible to use the quantities which are coupled by the coupling devices to establish the proper angular orientation for each mirror by incorporating into each mirror mount structure two fixed linear actuators arranged so that the degree of extension of a mobile component of each actuator is proportional to the tangent of a particular tilt angle component. The special fixed points at which appropriate values of the coupled control quantity must be established on the coupling devices by some appropriate primary control system will be referred to as control points, or control point positions.

While resistive coupling devices could readily be used for the collective control of mirrors in circular paths, it would in some cases be rather difficult to connect tensile elastic coupling devices to a group of mirrors along a path which changed directions relative to the fixed axis directions as radically as do circular paths. Circular paths also have the disadvantage of generally having a large rate of change of each tilt angle component with position, requiring that the coupling devices be constructed with considerable precision if accurate angular orientations are to be established for the mirrors. Linear paths, in row and column mirror patterns, are better suited for allowing connections to be made to elastic coupling devices, and generally also have a much smaller rate of change of tilt angle component with position than do circular paths. Linear paths initially would seem to have the disadvantage that there is no analytical indication that any useful control function can be accurately expressed along their length as a linear combination of values at remote points. However, linear row and column paths in a plane, having path directions which are respectively parallel to the particular axis of resolution about which tilt angle information is to be coupled on each path, do have the characteristic that the tilt angle component which is to be controlled along each path is symmetric about a fixed point on the path, which is the point of intersection with the path of a plane which is perpendicular to the particular axis of resolution and which passes through the radiation receiver. This symmetry property allows each tilt angle component, or any function of each tilt angle component, to be expressed along the associated linear path as a power series involving only even powers of distance from the symmetry point. This property alone motivated the initiation of a computational study of the errors which would be introduced by an attempt to couple tilt angle information between remote points on linear paths. Starting from simple quadratic approximations for the variation of each tilt angle component between computed end point values, and progressing eventually to a method, to be described in the detailed description of the invention, for generating highly accurate design data for coupling devices to be used in each particular row and column of the mirror array; it was found that all prospective control functions tested were capable of being coupled with great accuracy over distances on the order of the height of the radiation receiver. Three prospective control functions were tested to determine the intrinsic errors associated with the coupling process in orthogonal row and column mirror patterns. The tangents of the tilt angle components, which are associated with the use of fixed linear actuators for mirror control, and a type of function, to be explained with the aid of a figure of the drawing, which corresponds to the use of linear actuators pivoted at their bottom end, were tested for use with individual mirror mounts in large scale collectors. The tilt angle components themselves, which may be associated with the use of torsional coupling devices, were tested for use in small scale collectors.

While the most accurate coupling devices would be designed with a gradient of resistance or compliance suited to the particular mechanisms used for establishing the tilt angle components, and to the control functions which relate the configurations of those mechanisms to the component values established, it was found that the appropriate gradient for all control functions tested clustered around the values used for the analytically exact coupling of quantities proportional to the tangent functions over circular paths. As quantities proportional to the tangents of tilt angle components of properly oriented mirrors can be coupled over both circular paths and linear paths, using the same coupling devices, it must be concluded that the common properties shared by these paths, namely their smoothness and their mathematically symmetric form relative to the plane or planes which intersects the paths to define the control point positions, are sufficient conditions to allow accurate coupling of quantities proportional to the tangents of tilt angle components about fixed axes of resolution. The fact that the other control functions also proved to be capable of being coupled with low intrinsic error is interpreted as resulting from the fact that, over the relatively small range of tilt angle component values found on path intervals of the lengths considered, all smoothly varying monotonic functions of a tilt angle component would vary relatively linearly with respect to one another. They therefore vary relatively linearly with respect to the tangent function, which is assumed to be the fundamentally coupleable function. Despite the fundamental role assumed for the tangent functions, however, the other functions tested can be coupled with equal accuracy over linear paths, provided the design of the coupling devices is based on the procedure described in the detailed description of the invention, which takes into consideration the particular control function being used.

In many cases it will not be necessary to use the most accurate design data for the coupling devices to achieve adequate results. For the small scale collector, using torsionally coupled mirrors, it is assumed that several compromises in design, which significantly reduce the allowed accuracy of the collector, will be made for reasons of economy. The computed intrinsic errors of the compromised design are still quite low, however, and the actual errors will probably depend on the quality of the components used and the cars taken in fabrication. If tensile elastic coupling devices are to be used for direct mirror actuation in a large scale collector, the distance between control points for the tensile elastic system will be determined by the requirement that the compliance of the coupling device over each interval between control points is sufficiently low that wind produced forces will not produce excessive errors. The control points will therefore be relatively closely spaced and the intrinsic errors would be adequately low even if the tensile elastic coupling devices are constructed using relatively simple approximate design data. A preferred structure for a tensile elastic coupling device is a belt made up of many individual layers of high strength elastic material, with means provided to attach arbitrary numbers of additional layers of the high strength material over individual intervals to provide the desired gradient of compliance.

Long range control along the individual paths of a large scale collector may be accomplished by coupling voltage values over resistive coupling devices which are constructed using precision components and the best available design data. Alternatively, it would be possible to use less precise resistive coupling devices and to correct inaccuracies by monitoring the direction of reflected beams from selected mirrors along each path by means of electro-optical sensors which may be incorporated into the control system in an appropriate manner to correct the effects of inaccuracies introduced by the coupling devices. However, while the use of electro-optical sensors for controlling heliostat mirrors is well established, the construction of a sensor appropriate for use with mirrors whose tilt angle components are controlled about fixed orthogonal axes is different than the construction of sensors for use with conventional mirror mounts. The sensor must be constructed so that each pair of sensing elements, used for monitoring a particular tilt angle component, can be independently adjusted in rotational orientation about the optic axis of the sensor to a prescribed position depending on the location of the sensor in the mirror array. Also, in general, the deflections of the reflected beam from its intended direction tend to mix the effects of errors in the complementary tilt angle components, so each sensing element pair is not uniquely sensitive to errors in a single tilt angle component. However, examples have been worked out for worst case situations which indicate that the complementary sensing element pairs are sufficiently well correlated with particular tilt angle components to allow electro-optical sensors to be used as an adjunct to the collective control system, provided they are used in a system in which any error in each tilt angle component for a monitored mirror is to be driven to zero.

Although the analytical and computational studies which have been described relate directly to mirrors distributed over a plane surface, the resulting control system concepts may readily be generalized to mirrors distributed over a generally smooth, but non-plane, surface. The generalization results from the fact that the proper tilt angle components for a mirror at any point along a line radiating away from the radiation receiver would be identical. Therefore one can conceptually establish an appropriate mirror pattern in a hypothetical reference plane and then project that pattern onto the available surface, with the projections being of the nature of light beams directed from the radiation receiver through hypothetical mirror positions in the reference plane and then impinging on the actual surface to mark the positions for the actual mirrors. This process may physically be carried out for a large scale collector by cataloging the angular coordinates of the mirror positions in the reference plane, as seen from the radiation receiver, and directing a laser beam from the radiation receiver through these angular coordinates while marking off the points of impingement of the laser beam on the terrain. Alternatively, the proper paths on the available terrain could be mapped by computer if detailed topographic data were compiled for the area. The paths in the reference plane should have generally symmetrical mathematical form relative to at least one axis of a pair of orthogonal axes of symmetry in the reference plane, with the axes of symmetry intersecting at the point where a line through the radiation receiver intersects the reference plane perpendicularly. Each axis of symmetry is to be orthogonal to one of the chosen directions for the orthogonal axes of resolution for the mirrors, and hence parallel to the complementary axis of resolution. The axes of resolution for the actual mirrors are to have the same directions as established for the hypothetical array in the reference plane and hence must each be parallel to the reference plane. As there is therefore a relationship between the structure of a mirror mount and the orientation of the reference plane, it is generally desirable that the reference plane used for establishing the pattern for a large scale array be a horizontal plane in order that the mirror mount pedestals can conveniently be made vertical.

For a small scale torsionally coupled mirror array, the array could readily be made a plane array if it were hung in a vertical position. In that case, the plane of the array would coincide with the reference plane. However if the array is non-vertical, then either special support structures must be provided to keep the mirrors and torsional devices in a plane, or else the mirror array will sag. Allowing the torsional coupling devices to sag will produce directions for the appropriate axes of resolution which are not the same for all parts of the mirror array and will furthermore destroy the symmetry properties of the tilt angle components which had motivated the computational investigation of the coupling process in row and column mirror patterns. Nevertheless, by computationally allowing the array to sag slightly in one direction and taking the sag into account with appropriate first order corrections for the tilt angle components, it was found that, although substantial degradation of the expected accuracy was produced, the intrinsic errors of the sagging array were still quite acceptable for a small scale collector. It is therefore possible to support a small scale torsionally coupled mirror array solely by supporting the ends of the torsional coupling devices.

To establish, at the control points, the values of the analog quantity which is to be coupled along the coupling devices between control points, it is necessary to have an appropriate primary control system. For simplicity it has been assumed that for both large and small scale systems the basic component of the primary control system is a digital computer which computes both sun position data and the appropriate corresponding values of the analog quantities to be established at the control points. Alternate methods, such as using a sun tracking device to provide the sun position data from which control point values would be computed could also be used. In the case of the large scale collector, the computed values would be transmitted in digital form to local digital to analog converters located near control points, with the resulting voltages being impressed directly on resistive coupling devices, or used to control voltage controlled actuators for controlling tensile elastic coupling devices. For the small scale torsionally coupled mirror array, a special interpolative mechanical linkage, having an empirical justification, is suggested as an economical means of establishing approximately valid rotational positions at the ends of the coupling devices.

In all cases considered, it will be desirable that the primary control system be capable of establishing certain alternate values of the analog quantity at the control points in addition to the focusing mode values. For the large scale collector the control system should be able to bring all mirrors to a horizontal position in the case of very high winds, or to a large tilt angle in the case of hail. In the case of the small scale torsionally coupled mirror array, the principal applications are envisioned as being for rather sophisticated functions in which the mirrors are to be switched between the focusing mode and other preferred modes, as for example to switch a mirror array protected by a transparent covering to flat plate use on overcast days. It is this type of application for which the torsionally coupled mirror array is better suited than the simple rigidly linked system taught in U.S. Pat. No. 4,102,326.

DESCRIPTION OF THE DRAWINGS

The accompanying drawings illustrate the best mode presently contemplated by the inventor for carrying out the invention.

In the drawings.

DETAILED DESCRIPTION OF THE INVENTION

This invention is a solar energy collector having a central radiation receiver and a plurality of mirrors which are organized into specified mirror containing paths. The mirror containing paths are to be chosen from a class of path shapes which allow analog quantities proportional to the local value of one of a number of possible mathematical control functions to be specified, either exactly or to a high degree of precision, at all points along each individual path as a linear combination of the values of the control function at specified remotely situated control points on the path. Collective mirror control is provided by extended coupling devices which extend along each path and couple an appropriate analog control quantity to each mirror site. At each mirror site, means are provided to establish the proper tilt angle components based on the local values of the coupled analog control quantity. The allowed mirror path shapes are from a class of path shapes which is sufficiently broad that appropriate mirror patterns, using independently mounted mirrors for a large scale collector, may be established on any reasonably smooth terrain. The mathematical control functions to which the coupled analog control quantity is made proportional are functions of tilt angle components about fixed orthogonal axes of resolution. Direct use of the coupled analog control quantity for mirror control requires the use of conventional mirror mounts which structurally incorporate these fixed axes of resolution.

A primary goal of the invention, when applied to large scale use, is to make economically possible the use of smaller independently mounted mirrors than could be used with the individual aiming means which characterize the known large scale central receiver collector concepts. Using a larger number of independently mounted mirrors, which are each relatively small in size, should produce substantially better utilization of materials than other proposed large scale collector concepts, as the amount of structural material required for a heliostat normally will increase with increasing mirror dimensions at a substantially greater rate than will the area of the mirror.

When applied to small scale "rooftop" collectors, the preferred form of the invention is one in which the extended coupling devices serve also as structural members in a collective mounting structure. In this case, the mirrors will normally be collectively protected from the elements by a transparent protective covering. This form of the invention is well suited to use as a convertible collector; providing a highly concentrating mode in the presence of a large beam component of solar radiation, but converting to an active or passive nonconcentrating mode when focusing is not appropriate.

Figures 1, 1A, 1B:
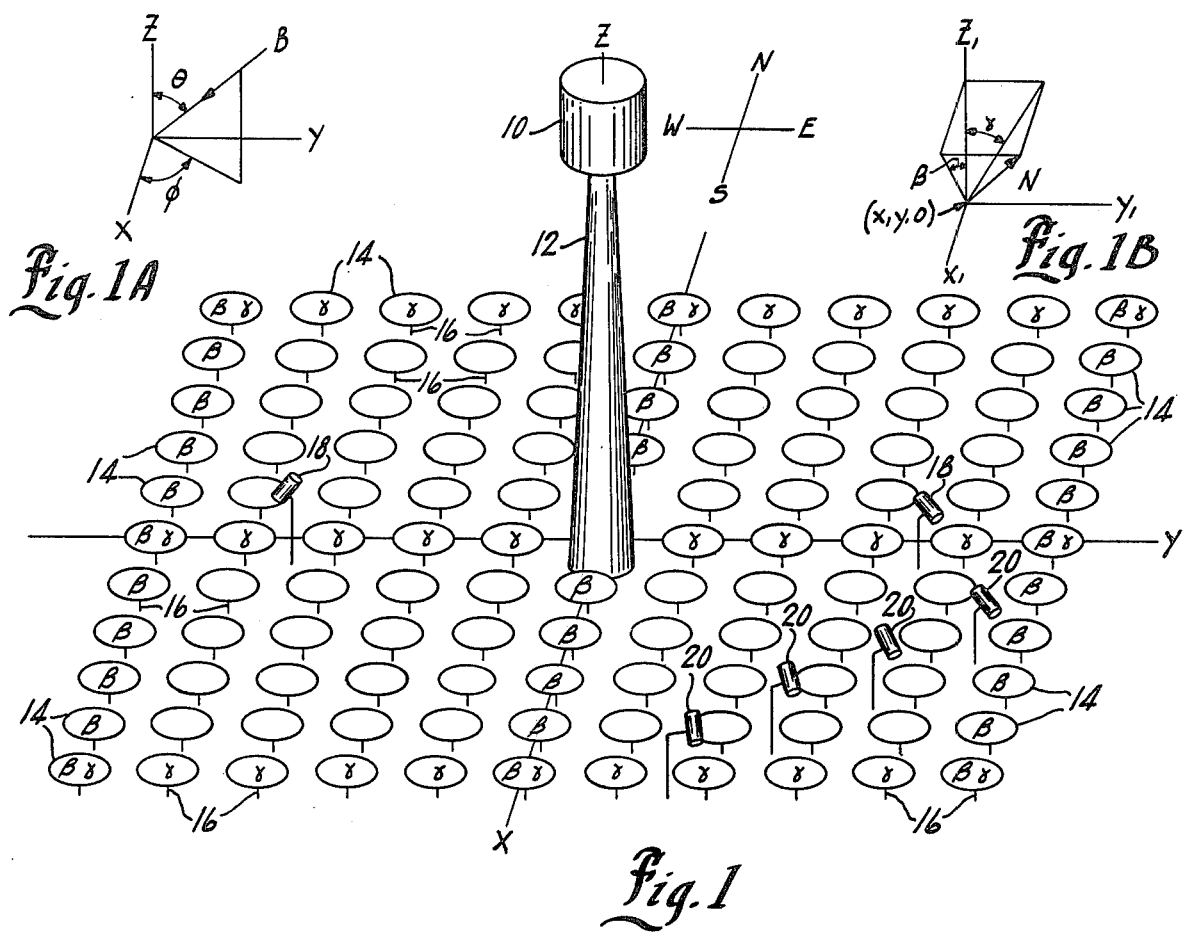
FIG. 1 illustrates an idealized form of the invention having mirrors in a row and column pattern on a plane surface. A three-dimensional rectangular coordinate system is superimposed on the figure to provide a framework for analysis of the analog coupling control system. The essential control point positions for this mirror pattern are indicated.
FIG. 1A is a diagram showing the resolution of the sun's position into conventional azimuthal and zenithal angular components.
FIG. 1B is a diagram showing the resolution of the angular orientation of the normal line to a mirror, not shown, into angular components about fixed orthogonal axes of resolution which characterize the invention.
Figure 2:
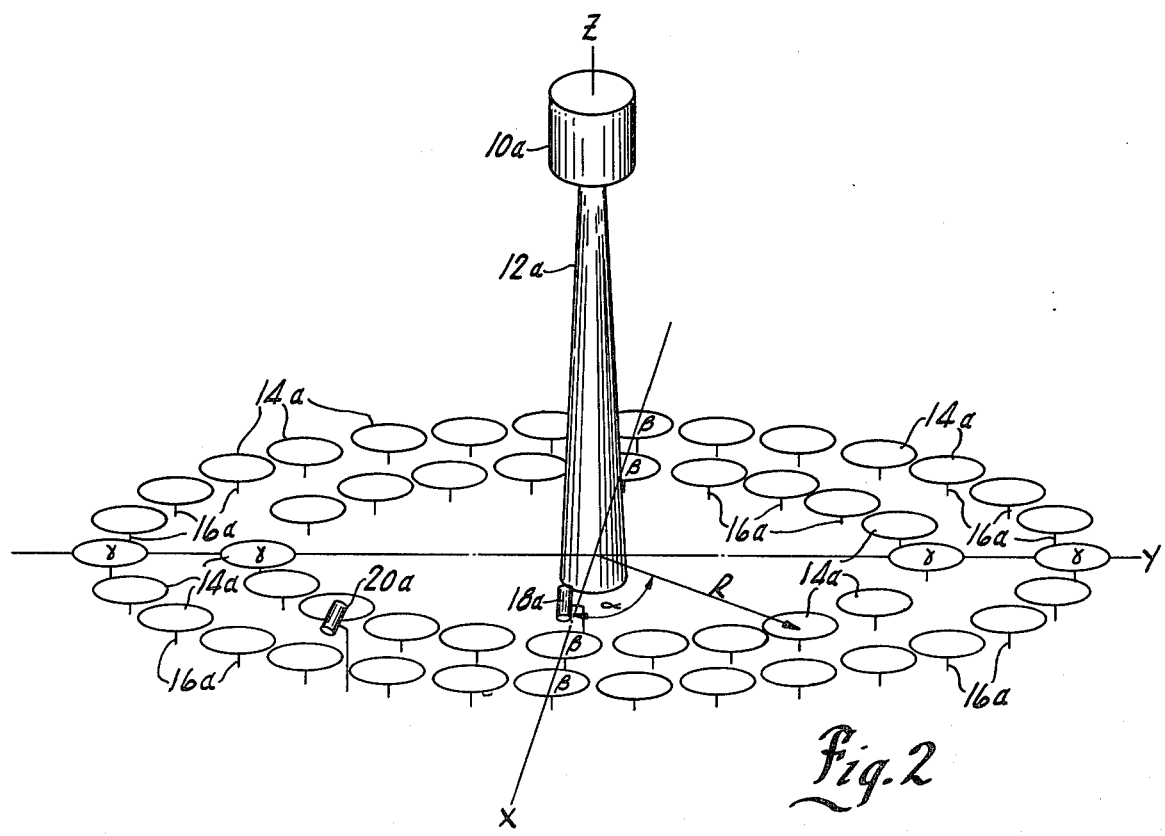
FIG. 2 illustrates an idealized form of the invention having mirrors in a circular pattern on a plane surface. Both a rectangular and a polar coordinate system are superimposed on the figure to provide a framework for analysis of the analog coupling control system. The essential control point positions for this mirror pattern are indicated.

Referring now to FIGS. 1 and 2, there are shown two examples of central receiver solar collectors using mirror patterns having mirror containing paths which are within the class of path shapes which are of potential use with the invention. Superimposed on the mirror patterns of FIGS. 1 and 2 are the coordinate axes of right handed rectangular coordinate systems which are useful in defining the important characteristics of the mirror patterns. In FIG. 1, the Z axis of the rectangular coordinate system passes through a radiation receiver 10, which is supported by a tower 12 at a height h above the X-Y plane, while the mirrors 14 are arranged in orthogonal rows and columns in the X-Y plane of the rectangular coordinate system, with the columns parallel to the X axis and the rows parallel to the Y axis of the coordinate system. The mirrors 14 of FIG. 1, which are individually supported by pedestals 16, are all shown in an orientation which will be referred to as the zero-angle orientation, in which the plane of each mirror is parallel to the X-Y plane of the rectangular coordinate system. In order for the mirrors 14 each to reflect solar radiation onto the radiation receiver 10, it is necessary to tilt each mirror 14 at an appropriate angle, which will depend both on the position of the individual mirror 14 relative to the radiation receiver 10 and on the position of the sun. FIG. 1A shows the resolution of the sun's position (or of the source of sunbeam B) into conventional spherical polar coordinates, where a zenith angle $\theta$ is measured from the Z axis of the rectangular coordinate system and an azimuthal angle $\phi$ is measured from the X axis in the X-Y plane. The specific quantities relative to FIG. 1A which enter into the equations which contain the mathematical basis for the invention are the direction cosines of the sun's position relative to the X, Y, and Z axes of the coordinate system. These direction cosines are equal to $\sin\theta\cos\phi$, $\sin\theta\sin\phi$, and $\cos\theta$ respectively. FIG. 1B shows the resolution of the angular orientation of the normal N to a mirror, not shown, which is located at point (x,y,O), into components about the fixed axes of resolution which characterize the invention. At a particular mirror site (x,y,O) the resolved tilt angle components of the mirror normal are shown relative to a local coordinate system having axes $X_1$, $Y_1$, and $Z_1$ which are parallel to the X, Y, and Z axes respectively of the principal coordinate system. The angular orientation of the mirror normal is shown in FIG. 1B to be resolved into a first component, $\beta$, which is resolved about a first axis of resolution which coincides with the $Y_1$ axis of the local coordinate system, and into a second component, $\gamma$, which is resolved about a second axis of resolution which coincides with the $X_1$ axis of the local coordinate system. Relative to the mirror at position (x,y,O), the direction cosines of the position of the radiation receiver at (O,O,h) with respect to the X, Y, and Z axes are $-x/S$, $-y/S$, and $h/S$ respectively, where S is the slant distance $(x^2+y^2+h^2)^{1/2}$ between the radiation receiver 10 at (O,O,h) and the particular mirror 14 at (x,y,O). The appropriate direction for the normal to the mirror at (x,y,O) may be represented by a unit vector which must be equal to a normalizing factor times the vector sum of a unit vector directed toward the sun plus a unit vector directed toward the radiation receiver. The tangent of $\beta$, which is the ratio of the X component to the Z component of the mirror normal unit vector, and the tangent of $\gamma$, which is the ratio of the Y component to the Z component of the mirror normal unit vector, may be most readily expressed, as the normalizing factor cancels out. The expressions for the tangents are:

$$\tan\beta = \frac{\sin\theta\cos\phi - x/S}{\cos\theta + h/S}$$
$$\tan\gamma = \frac{\sin\theta\sin\phi - y/S}{\cos\theta + h/S}$$

It should be noted that the expression for $\tan\beta$ for any point on a row of the mirror pattern of FIG. 1, where the rows are parallel to the Y axis, is symmetric about the intercept of the row with the X axis. Similarly the expression for $\tan\gamma$ for any column is symmetric with respect to the intercept of the column with the Y axis. The fact that, regardless of sun position, there is a symmetry about fixed axes of symmetry in a plane for the tilt angle components, as resolved about fixed axes of resolution which are orthogonal to the axes of symmetry in the plane, is a rather surprising result which provided the motivation for the investigation which led to the analytical and computational foundation for the invention.

The row and column pattern of FIG. 1 appears in many respects to be the most promising mirror pattern for use with the collectively controlled mirrors of the invention. However the control is of high precision but not mathematically exact for this mirror pattern and a computational investigation with a digital computer is required to detect the possibility of such precision and apparently also to perfect the means by which the control may be optimized. In order to make the computed results for the collector of FIG. 1 plausible, the simpler case of the circular mirror pattern of FIG. 2, where analytical results may be used, shall be presented first, after which the results from the more general case, as represented by the mirror pattern of FIG. 1 shall be summarized.

In the mirror pattern of FIG. 2, the individual mirror containing paths are concentric circles in the X-Y plane of the rectangular coordinate system, with the circles centered on the origin of the coordinate system, which is the point where the Z axis, which was chosen to pass through the radiation receiver 10a, intersects the X-Y plane. In this case, it is appropriate to specify the position of an individual mirror 14a in terms of plane polar coordinates R and α, where R is the radius of a circular path and α is a polar angle measured from the X axis in the X-Y plane. The X and Y coordinates of an individual mirror would then be equal to Rcos α and Rsin α respectively, while the slant distance between a mirror 14a and the aiming point associated with the radiation receiver 10a is $(R^2+h^2)^{1/2}$. Substituting into the equations for tan β and tan γ, the results are:

$$\tan\beta = \frac{\sin\theta\cos\phi - R\cos\alpha/S}{\cos\theta + h/S}$$

$$\tan\gamma = \frac{\sin\theta\sin\phi - R\sin\alpha/S}{\cos\theta + h/S}$$

where in this case the slant length S is constant for any given circular path. For any given sun position, the only quantities in these expressions which differ for different mirrors 14a on a given circular path are cos α in the expression for tan β, and sin α in the expression for tan γ. As these quantities appear linearly in the numerators of the respective expressions for the tangent functions, the value for tan β at any point on a circular path may be expressed as a linear combination of its values at the positions of extreme values of cos α, while the values of tan γ at any point may be expressed as a linear combination of its values at the positions of extreme values of sin α. With the values of tan β at the intersections of the nth circular path with the positive and negative X axis labeled $(\tan \beta)_{n1}$ and $(\tan \beta)_{n2}$ respectively, and with the values of tan γ at the intersections of the circular path with positive and negative Y axis labeled $(\tan \gamma)_{n1}$ and $(\tan \gamma)_{n2}$ respectively, the expressions for tan β and tan γ at any position on the path may be written:

$$\tan \beta = (\tan \beta)_{n1} + (\tfrac{1}{2} - \tfrac{1}{2}\cos \alpha)((\tan \beta)_{n2} - (\tan \beta)_{n1})$$

$$\tan \beta = (\tan \gamma)_{n1} + (\tfrac{1}{2} - \tfrac{1}{2}\sin \alpha)((\tan \gamma)_{n2} - (\tan \gamma)_{n1})$$

Because the tangents of β and γ for any mirror on a circular path may be expressed as linear combinations of their values at pairs of points where the circular path intersects the X and Y axes, it is possible to construct coupling devices which couple analog control quantities, such as voltages or mechanical displacements, which are proportional to the local values of the tangent functions, to all positions on the path, if the proper values of these analog quantities are established by an appropriate primary control system at the intersections of the path with the respective axes of the coordinate system. A voltage can be coupled by a series resistance coupling device in which the value of the resistance between any two mirror positions on the circular path is proportional to the difference between coefficients for those positions in the appropriate linear combination expression. A mechanical displacement can be coupled by an elastic coupling device having elastic members in series, with the compliance of the individual elastic members governed by the same rules as apply to the resistive members of the resistive coupling device. As an example, the resistance to be inserted between mirror positions i and i+1 on a resistive coupling device used to couple a voltage proportional to the proper local value of tan β to all mirror positions on a circular path would be $C(\cos \alpha_i - \cos \alpha_{i+1})$, where i is counted from the intersection of the circular path with the positive X axis, along each semicircular path to the intersection with the negative X axis. The constant C is in this case equal to half the total resistance along an individual semicircular path. Similarly the resistance value between mirror positions j and j+1 in a resistance coupling device used to couple a voltage proportional to tan γ would be $C(\sin \alpha_j - \sin \alpha_{j+1})$, where j is counted along each semicircular path starting from the intersection of the circular path with the positive Y axis. The positions on each circular path where the analog control quantities which are proportional to tan β or tan γ must be established on the coupling devices by a primary control system will be called essential control points or control point positions. These control points are designated in FIG. 2 by placing a β or γ label on mirrors 14a at the respective intersections of the circular paths with the coordinate axes. The coupling devices themselves are not represented in FIG. 1 or 2.

It is possible to construct a heliostat of unconventional design (which will be shown in FIG. 3) in which the proper tilt angle for a mirror is established by a pair of fixed linear actuators, the first of which varies the position of a first control linkage linearly with the values of tan β and the second of which varies the position of a second control linkage linearly with the value of tan γ. By using this type of heliostat, it is possible to directly convert the values of the analog control quantity established by the coupling devices into proper mirror orientations using techniques which will be described with reference to later figures of the drawing. It may be noted, however, that if the coupled quantity is a voltage, the coupling devices could also potentially be used with conventional types of mirror mounts, such as the azimuthal-zenithal mount, by using transformation circuits which digitalize the voltages representing the tilt angle components about fixed axes of resolution and transform the digital information, in combination, into angular information relevant to the azimuthal-zenithal mount.

While the analysis which shows the possibility of collectively controlling the mirrors 14a of FIG. 2 in a nominally exact manner may be specifically carried out for mirrors 14a in a circular pattern in a plane (or on a surface of revolution about the Z axis), it is important to note that the result may very simply be generalized to any relatively smooth terrain which would be encountered in the case of a large scale central receiver collector. The generalization comes about by noting that if a mirror is moved along a fixed line which radiates away from the radiation receiver, the tilt angle components required for reflecting radiation from a distant source onto the radiation receiver would not change. The angular coordinates of the mirror positions, as viewed from the aiming point associated with the radiation receiver 10a, could be cataloged for the circular mirror pattern if FIG. 2 or for any other regular pattern in a reference plane. The appropriate pattern could then be formed on the surface of the existing terrain by placing a laser at a distance of one pedestal height below the aiming point of the radiation receiver 10a and sequentially directing the laser beam through the array of angular coordinates which correspond to mirror positions in the reference plane, while marking off the points of impingement of the laser beam on the available terrain. Alternatively, an appropriate mirror pattern could be mapped for the available terrain by computer if detailed topographic data were compiled.

While the tangents of tilt angle components resolved about fixed orthogonal axes of resolution for mirrors in a pattern based on circular path shapes are the only apparent control functions for which analog quantities can be coupled exactly by extended coupling devices; the boundaries of the invention are much broader, both with regard to the allowed path shapes and with regard to the variety of control functions which may be used for establishing the analog coupling. There are two principal reasons for considering control functions and mirror pattern which inherently allow only a highly precise approximate coupling control of the mirrors when a nominally exact coupling control is available by using circular mirror patterns. One of these reasons is that other available mirror patterns such as the orthogonal row and column mirror pattern of FIG. 1 will typically be associated with a much more gradual change of tilt angle components with position along the paths, and will therefore be more capable of tolerating errors in the coupling devices. The second reason is that some otherwise desirable types of elastic coupling devices are difficult to connect to mirror mounts when these mirror mounts are in paths which change in orientation as drastically as do the circular paths of FIG. 2.

For the orthogonal row and column mirror pattern of FIG. 1, the essential control points for the function which controls the tilt angle component $\beta$ are at the intersections of the rows with the X axis and at the ends of the rows. The essential control points for the $\gamma$ control functions are at the intersections of the columns with the Y axis and at the ends of the columns. Extensive computational investigation of several different potential control functions for possible use in control systems for mirrors in the mirror pattern of FIG. 1 has shown that all functions tested could be used in control systems which, although not exact, would have only small intrinsic errors introduced by the coupling process. If the analog control quantity were to be coupled over distances comparable to the height of the radiation receiver in a 2h×2h mirror array with a centered radiation receiver, the total intrinsic error in angular orientation is computationally found to be under one milliradian at the great majority of individual mirror sites for all reasonable sun positions, provided the coefficients for designing the coupling devices are as good as, or better than, those generated by a method which will be described. If the size of the mirror array is substantially larger than 2h×2h, as would normally be the case for a large scale collector, then it becomes desirable to insert secondary control points between the essential control points, so that the analog control quantity is not coupled, without secondary control, over distances greater than the height of the radiation receiver in the orthogonal row and column mirror pattern. As the rate of change of the tilt angle components with position is larger in the outer regions of a large rim angle collector than is the case for a 2h×2h collector, the distance between control points in the outer regions should in fact be reduced to substantially less than the height of the radiation receiver. For a 4h×4h collector with control points at 0, ±0.8h, ±1.4h and ±2h on each row and column it was found that the computed intrinsic errors were generally comparable to those for a 2h×2h collector using only the essential control points.

The potential control functions for which these computations were carried out where $\beta$ and $\gamma$ themselves, which may be associated with control by torsional elastic coupling devices; tan $\beta$ and tan $\gamma$, which may be associated with the use of fixed linear actuators for mirror control in the mirror mounts; and $(A_1 \pm \sin(\beta \mp \epsilon_1))^{\frac{1}{2}}$ and $(A_2 \pm \sin(\gamma \mp \epsilon_2))^{\frac{1}{2}}$, which are associated with the use of pivoted linear actuators for mirror control in the mirror mounts. In the last set of functions $A_1$ and $A_2$ are constants which, for computational testing were set equal to each other, with numerical values of either 1.7 or 3, and $\epsilon_1$ and $\epsilon_2$ are constants which were set equal to each other at values 0, 0.1 radian, or 0.2 radian. Examples of mirror mounts suitable for use with the various tested control functions will be shown in later figures of the drawing.

It was found that the coefficients generated for designing the coupling devices for all the control functions tested for use in orthogonal row and column mirror patterns clustered rather closely together. For coupling between essential control points in a 2h×2h mirror array, the coefficients for all rows and columns, but particularly for rows and columns near the periphery of the mirror array, could be approximated, for all control functions, by the expression $(1-\cos \pi l_m/2L)$, where $l_m$ is the distance from the essential control point on an axis of symmetry to the particular mirror position for which the coefficient is being evaluated and L is the distance from the essential control point on the axis of symmetry to the end of the row or column. For coupling between essential control points in a 4h×4h collector, this expression remains an excellent approximation to the best coefficients for the peripheral rows and columns, but is not a particularly good approximation for rows and columns near the axes of symmetry to which they are respectively parallel. The expression $(1-\cos \pi l_m/2L)$ is exactly that which would yield the coefficients for the exact coupling of the tangent functions on the circular mirror pattern of FIG. 2 if the coupling was to be made over quarter circle path segments between an essential control point on the appropriate axis of symmetry for each tangent function and secondary control points inserted on the complementary axis of symmetry. Thus, if a coupling device which was designed for coupling an analog control quantity proportional to a tangent function over the circular paths of FIG. 2 were cut at the axis of symmetry at which no control point was required, and the cut segments were straightened from their initial semicircular shape to the linear shape, they could function reasonably well as coupling devices for all rows and columns of a 2h×2h mirror array, and for the peripheral rows and columns of a 4h×4h mirror array. The coupling devices appropriate for use between essential control points for rows and columns near the axes of symmetry for a 4h×4h mirror array could roughly be approximated by grafting together sections of coupling devices from circular paths of progressively greater radii, although this model cannot be pushed to far.

As an analog quantity proportional to the tangents of tilt angle components about fixed orthogonal axes of resolution, for mirrors properly oriented to reflect solar radiation onto the radiation receiver, can be coupled over both circular paths and linear paths, using the same coupling devices, it must be concluded that the coupling devices would also be functional on other path shapes which share the common features of the circular and linear paths considered. The apparently important common features for the circular and linear paths considered in the reference plane are that both are smooth and both are of mathematically symmetric form about the axis of symmetry which contains an essential control point for the axis of resolution about which control is exerted along the path. The fact that values of an analog quantity could also be used to represent, with low intrinsic error, the local values of the other control functions tested on orthogonal row and column mirror patterns is interpreted as being due to the fact that, over the relatively small range of tilt angle component values found on path intervals of the lengths considered, the other smoothly varying monotonic functions of the tilt angle components would vary relatively linearly with respect to the tangent functions, which are assumed to be the fundamentally coupleable functions. On paths having a large curvature, the rate of change of tilt angle component with position is more rapid than for the linear paths considered, and the use of control functions other than the tangent functions on paths of high curvature would be expected to require closer spacing of the control points than is required with linear paths. There does not appear to be any substantial motivation for considering the use of control functions other than the tangent functions on highly curved paths. However, the use of slightly curved paths in non-orthogonal row and column mirror patterns in the reference plane may be desirable as a means of obtaining a desired density distribution for the mirrors. The use of slightly curved non-orthogonal paths of mathematically symmetric form with respect to an axis in the reference plane would not be expected to significantly change the results computationally found for the orthogonal row and column patterns.

Although it is possible to couple an analog control quantity proportional which is approximately to any of the control functions tested by using coupling devices designed with coefficients given by the expression $(1-\cos \pi l_m/2L)$ for all rows and columns of the mirror pattern of FIG. 1, the principal computational investigation of the potential accuracy of analog coupling mirror control was carried out using coefficients which were specifically computed for each row and column and which took into account the particular control function being tested. These specifically computed coefficients generally produced considerably lower intrinsic errors than did the relatively crude coefficients available by evaluation of the expression $(1-\cos \pi l_m/2L)$, and it would be these specifically computed coefficients which would be recommended for long range coupling in a large scale collector. The method of computing these more accurate coefficients will be referred to as the empirical method, as it was initially necessary to carry out certain empirical procedures which make the subsequent evaluation of the coefficients for the tested control functions relatively straightforward.

The empirical method of generating coefficients may best be understood by first assuming that the control function is capable of being exactly represented over the path interval between essential control points as a fixed linear combination of its values at the control points. In that case, it would be possible to compute the required coefficients by choosing any particular sun position and computing for that sun position the values of the control function which, at each mirror position, would yield the proper tilt angle components to reflect the sun's rays toward the aiming point associated with the radiation receiver. If the control functions were the tangent functions, for example, these would be evaluated at each mirror position using the expressions given earlier. If the control functions were to be the tilt angle components themselves, the tangent functions would be evaluated at each mirror position for the chosen sun position and the inverses taken to find the tilt angle components. If the control functions were $(A_1 \pm \sin(\beta \mp \epsilon_1))^{\frac{1}{2}}$ and $(A_2 \pm \sin(\gamma \mp \epsilon_2))^{\frac{1}{2}}$, the values of the tangents would be found at each mirror position and the inverses taken to find the values of the tilt angle components which would then be inserted into these control functions. Still assuming that each control function for properly oriented mirrors may be represented exactly along an appropriate path as a linear combination of the control point values, an appropriate set of coefficients for a given control function on a path could be found by substracting the value of the control function at the essential control point on an axis of symmetry from the value of the function at each mirror position on the path, and dividing the result in each case by the difference between the values of the control function at the control points at the axis of symmetry and at the end of the row or column. Given the control point values of the control function for some new sun position, the new value of the control function at any particular mirror position along the path could be determined by multiplying the coefficient found for that mirror position by the difference between the values of the control function at the axis of symmetry and at the end of the row or column for the new sun position and adding the result to the new value at the axis of symmetry. The coefficients could be used to design coupling devices by choosing the value of resistance or compliance for a component to be inserted between two mirror positions, for resistive or elastic coupling devices respectively, to be proportional to the difference between coefficients for the mirror positions.

When the control functions can only be approximately expressed as linear combinations of the control point values, as is the case for row and column mirror patterns, the process described in the preceding paragraph may still be carried out. However in this case the values of the coefficients will depend somewhat on the choice of the initial sun position, or reference source position, used for the evaluation of the coefficients. The empirical method of finding accurate sets of coefficients consisted of computing sets of coefficients using a number of different reference source positions, and testing each set by computing the intrinsic errors introduced into the linear combination expressions for a large number of real sun positions in order to empirically determine the optimum reference source position to use in the computation of accurate coefficients for each of the control functions tested. The arrays used for this empirical testing were 11×11 computational arrays which were typically made to correspond to a 2h×2h horizontal mirror array at 45° latitude with the X axis directed southward and the Y axis directed eastward. The real sun positions for which the intrinsic errors were computed were the sun positions at each hour within five hours of solar noon for a summer solstice, a winter solstice, and an equinox. The recommended reference source positions were generally chosen by minimizing the number of mirror positions having overall intrinsic angular error greater than one milliradian during the combined test periods. The reference source position data decided by the testing of the 2h×2h array at 45° latitude were generally applied without further evaluation to other array conditions of interest, such as arrays at latitudes other than 45° and arrays larger than 2h×2h. It is not evident that the optimum reference source position for other array conditions would be identical to that chosen for the 2h×2h array at 45° latitude. However, the quality of the coefficients generally changed only slowly with changing reference source position, particularly for the functions other than the tangent functions, so it seemed unlikely that much would be gained by attempting to reoptimize the reference source position for differing array conditions. It is also not evident that a single reference source position is simultaneously optimum for rows and columns which differ greatly in distance from the coordinate axis to which they are parallel. It may, therefore, be possible to elaborate the empirical method to obtain even better coupling coefficients by optimizing the reference source position for different areas in the mirror array rather than for the entire array simultaneously. However, such possible elaborations would only be of interest if it should prove fairly simple to construct coupling devices which can utilize the degree of accuracy already available from coefficients generated by the empirical method.

The empirically determined recommended reference source positions for the various control functions tested are as follows: For tan $\beta$ and tan $\gamma$ a recommended reference source position is at a zenith angle of about 65°. The coupling coefficients generated by the empirical method for the tangent functions in an orthogonal row and column mirror pattern are independent of the azimuthal angle of the reference source position, so the intrinsic errors of the coupling would go to zero twice each day as the sun went through the zenith angle of the reference source position used for designing the coupling devices. For the functions $\beta$ and $\gamma$ the recommended reference source position is at a zenith angle of about 50° and an azimuthal angle of 45°. To make the coupling process equivalent for morning and afternoon sun positions, the values of coefficients from equivalent mirror positions on columns which were equidistant from the X axis were averaged. Later the array of coefficients was completely symmetrized by also averaging the coefficients from rows which were equidistant from the Y axis, as this did not seem to adversely effect the computed intrinsic error. For the functions $(A_1 \pm \sin(\beta \mp \epsilon_1))^{\frac{1}{2}}$ and $(A_2 \pm \sin(\gamma \mp \epsilon_2))^{\frac{1}{2}}$, an appropriate position for the reference source seems to be directly overhead at a zero zenith angle. To make the coupling process equivalent for morning and afternoon sun positions for these functions the plus and minus signs were reversed in the east and west halves of the test array for the function $(A_2 \pm \sin(\beta \mp \epsilon_2))^{\frac{1}{2}}$, corresponding to the east-west tilting actuators being oppositely positioned with respect to the pedestals.

To compute coefficients using the empirical method when secondary control points are to be used, as required for accurate long range coupling when the array size is substantially greater than 2h×2h, the value of the control function at the inner control point on a particular interval between control points may be subtracted from the values of the function at the individual mirror positions on the interval, and the results divided by the difference between the value of the control function at the inner control point and the outer control point, with all values computed for a reference source at its empirically determined recommended position. In using the coefficients to design coupling devices, the proportionality which is to exist between the values of a component of a coupling device and the difference in coefficients for the positions between which the component is to be inserted is applicable only over each individual interval between control points. There are no general rules which relate the components of a coupling device on opposite sides of a control point. However, there are frequently special considerations which dictate the manner in which the components on different intervals of a particular type of coupling device should be related. Some of these considerations will be pointed out in later examples.

Referring again to the specific content of FIG. 1, there is shown a small number of optional electro-optical sensors 18 at essential control points on the axes of symmetry and electro-optical sensors 20 off the axes of symmetry. The use of electro-optical sensors with the invention, either for simply monitoring the reflected beams from selected mirrors 14 in order to detect faults in the mirror control system, or for serving as part of the control system, involves problems which are peculiar to this invention and are related to the use of fixed orthogonal axes of resolution about which the tilt angle components are to be established. It appears to be necessary to construct the electro-optical sensors 20 in a special way which allows internal sensing elements to be positionally adjusted for a particular area of use in the mirror array. (This construction will be explained with reference to FIG. 11). Also the deflections of the reflected beam from its intended direction tend to mix the effects of errors in complementary tilt angle components. However, the sensing elements of the electro-optical sensors 20 do appear sufficiently well correlated with a particular tilt angle component for the sensors 20 to serve in a system in which the errors in both tilt angle components are to be driven to zero. It will frequently be desirable that the sensors 20 be arranged in lines which are diagonal to the row and column directions, as shown in FIG. 1, to allow each sensor to correct the analog quantity on the coupling devices of both a row and a column without duplication of effort.

The electro-optical sensors 18, which are at the axes of symmetry, differ from the sensors 20 only in the positional adjustment of their internal sensing elements. However, the sensors 18 are distinguished by their ability to uniquely monitor and correct the tilt angle component having an essential control point on the axis of symmetry without regard to small errors in the complementary tilt angle component.

Of the control functions which have been evaluated, the functions tan $\beta$ and tan $\gamma$ and the functions $(A_1 \pm \sin(\beta \mp \epsilon_1))^{\frac{1}{2}}$ and $(A_2 \pm \sin(\gamma \mp \epsilon_2))^{\frac{1}{2}}$ are associated with mechanisms which are most compatible with the individual pedestal mounted mirrors which would be used in large scale collectors. The figures of the drawing depicting mirror mounts having individual pedestals will therefore pertain to the use of these functions. Although the functions $\beta$ and $\gamma$ themselves could be used with pedestal mounted mirrors, there appear to be problems of mechanical interference which force a rather cumbersome structure. Therefore the functions $\beta$ and $\gamma$ will be reserved for use with figures depicting a form of the invention which uses a collective mounting structure without pedestals, which is intended for use in small scale applications. In order to simplify the description of the mirror mounts intended for large scale use, it will be assumed that the reference plane on which the pattern is established for the mirror array is perpendicular to the desired direction of orientation of the mirror mount pedestals. For mirror mounts intended for use in a large scale collector, it will typically be desired to use vertically oriented pedestals. Therefore, the reference plane used for establishing the mirror pattern will be assumed to be horizontal. If, because of local topography or some other factor, it is strongly desired to use a reference plane which is not horizontal, then either the mirror mount pedestals will have to be tilted to remain normal to the reference plane or the tilt will have to be built in to the mounts by changing the structure from that depicted in the following figures.

Figure 3:
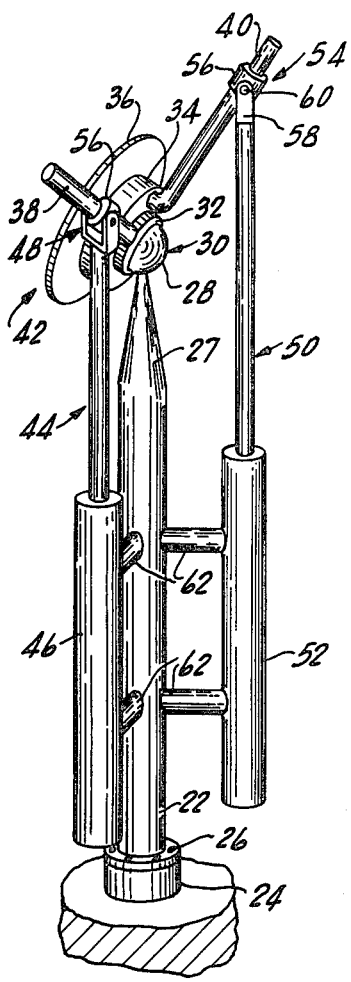
FIG. 3 illustrates a mirror mount, shown without the mirror, using fixed linear actuators for controlling tilt angle components about fixed orthogonal axes.

Referring now to FIG. 3, there is shown a mirror mount suitable for direct control by a coupled analog quantity having values proportional to tan $\beta$ and tan $\gamma$. The mirror mount of FIG. 3 has a support pedestal 22 which is shown mounted in a position adjusting socket 24 having a cap 26. The position adjusting socket 24 is fixed to a post or piling, not shown, which extends into the earth to a sufficient depth to provide a stable base. The pedestal 22 is shown with a tapered top 27 to which is attached a fixed component of an articulated support joint, which is preferably the ball components 28 of a ball and socket joint 30. The socket component 32 of the ball and socket joint 30 is rigidly connected to the inner race, not shown, of a ring bearing having an outer race 34 which is rotatable about the socket component 32, about an axis which passes through the center of rotation of the ball and socket joint 30. A mounting plate 36 is rigidly connected either to the combination of socket component 32 and inner bearing race, not shown, or to the outer bearing race 34. To the socket component 32 there is rigidly fixed a cylindrical slide arm 38. Also to the outer bearing race 34 there is fixed a cylindrical slide arm 40. Both slide arms 38 and 40 are mounted so they are directed radially outward from the center of rotation of the ball and socket support joint 30 and are normal to the axis of rotation of the ring bearing comprised of the outer race 34 and the inner race, not shown. In combination, the socket component 32 and inner bearing race, not shown, the outer bearing race 34, the mounting plate 36, and the slide arms 38 and 40, will be referred to as the tiltable structure assembly 42. The orientation of the tiltable structure assembly 42 is established by the combination of a control linkage 44 which extends from a linear actuator 46 and engages slide arm 38 by means of a slidable linkage joint 48, and a control linkage 50 which extends from a linear actuator 52 and engages the slide arm 40 by means of a slidable linkage joint 54. Slidable linkage joints 48 and 54 are each comprised of bushing members 56, which slidably and rotatably engage the respective slide arms 38 and 40, yoke members 58 which are fixed to the respective control linkages 44 and 50, and pivot members 60 which pivotally connect yoke members 58 to bushing members 56. The linear actuators 46 and 52 are connected to the pedestal 22 by braces 62 in such a position that the lines of motion of control linkages 44 and 50 are parallel. Further, the line of motion of control linkage 44 together with the center of rotation of the support joint 30 must define a plane which is orthogonal to the plane defined by the line of motion of control linkage 50 and the center of rotation of the support joint 30. The mirror mount must be installed in the mirror array so that each of these planes is orthogonal to one of the axes of symmetry in the reference plane used for establishing the mirror pattern. The lines of motion of control linkages 44 and 50 must be orthogonal to the reference plane.

Those having a knowledge of trigonometry will recognize that the respective elevations of the slidable linkage joints 48 and 54, measured relative to the height of the center of rotation of the ball and socket joint 30, are each proportional to the tangent of one of a pair of complementary tilt angle components resolved about fixed axes of resolution. The degree of extension of control linkages 44 and 50 from linear actuators 46 and 52 respectively are therefore governed by tangent functions which have previously been shown to be capable of exact representation as linear combinations of the values of appropriate control points for the circular mirror pattern of FIG. 2, and have been found to be capable of highly precise approximate representation as linear combinations of the values of appropriate control points for row and column mirror patterns similar to FIG. 1. Means of controlling the degree of extension of control linkages 44 and 50 from linear actuators 46 and 52 respectively by the use of coupling devices will be illustrated in latter figures of the drawing.

In general, it will be necessary for the linear actuators 46 and 52 to have a sufficiently long stroke to vary each tilt angle component for any given mirror between the extreme values required on the path containing the mirror. For axes of resolution aligned in the east-west and north-south directions, the range of tilt angle components will be particularly great for the east-west tilt which takes place about the north-south axis of resolution. Substantial reduction in the stroke length requirement for the actuators, for a given displacement of the lines of motion of the control linkages 44 and 50 from the center of rotation of the ball and socket joint 30, may be made by placing the actuators which produce the east-west tilt on the opposite side of the pedestal for mirror mounts which are west of the radiation receiver than for mirror mounts which are east of the radiation receiver. Reversing the positions of the actuators in this way for mirrors in a circular pattern would generally make the east and west halves of the mirror field into separate arrays so far as control of the east-west tilt angle components is concerned, and would require separate control points along the north-south axis of symmetry. No additional complexity would be introduced into the row and column mirror pattern by reversing the position of the actuators in the east and west halves of the mirror array.

The control linkages 44 and 50 are subject to wind produced bending moments, particularly in the radial direction, and must be made sufficiently rugged to withstand these forces without producing excessive alignment errors. It is largely on the basis of relative ability to withstand wind forces that the preferred control mechanism should be chosen.

Figure 4:
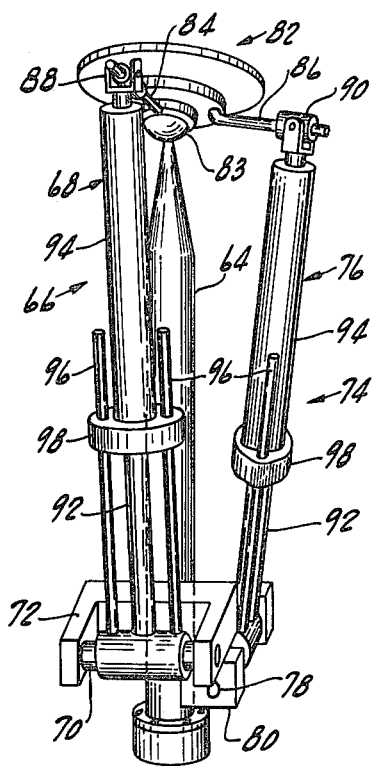
FIG. 4 illustrates a mirror mount, shown without the mirror, using pivoted linear actuators for controlling tilt angle components about fixed orthogonal axes.
Figure 4A:
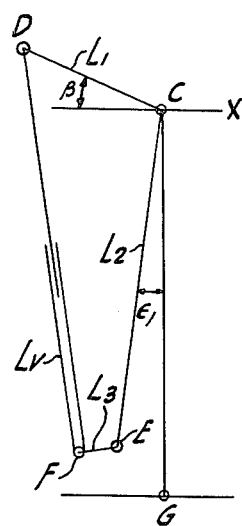
FIG. 4A is a diagram used for deriving the mathematical control functions appropriate for the mirror mount of FIG. 4.

Referring now to FIG. 4, there is shown an example of a mirror mount suitable for direct control by a coupled analog quantity having values proportional to the functions $(A_1 \pm \sin(\beta \mp \epsilon_1))^{\frac{1}{2}}$ for control of the tilt angle component $\beta$ and $(A_2 \pm \sin(\gamma \mp \epsilon_2))^{\frac{1}{2}}$ for control of the tilt angle component $\gamma$. FIG. 4A is a diagram used for explaining the meaning of these functions. The mirror mount of FIG. 4 has a pedestal 64, mounted similarly to the mount shown in FIG. 3, and uses linear actuators as did the mount shown in FIG. 3. However, rather than being fixed in direction, linear actuator 66, which actuates control linkage 68, is fixed to a pivot 70 which is pivotally connected to a yoke 72 fixed to the pedestal 64. Similarly, linear actuator 74, which actuates control linkage 76, is fixed to a pivot 78 which is pivotally connected to a yoke 80 fixed to the pedestal 64 in orthogonal orientation to the yoke 72. Pivots 70 and 78 define the directions of the axes of resolution for the mount and must each be aligned perpendicularly to one of the axes of symmetry for the mirror array and parallel to the complementary axis of symmetry. The tiltable structure assembly 82, which tilts about the ball and socket support joint 83, is similar to the assembly shown in FIG. 3 except that the control arms 84 and 86 are not slide arms. Control linkage 68 engages control arm 84 at a fixed point on the arm 84 by means of a linkage joint 88. Similarly, control linkage 76 engages control arm 86 at a fixed point along arm 86 by means of linkage joint 90.

There are several types of linear actuators which may be used with either the mirror mounts of FIG. 3 or FIG. 4. Some of these actuators will be depicted in later figures of the drawing. The particular type of actuator represented by components 66 and 74 of FIG. 4, however, is a known type of electromechanical actuator which appears to have desirable properties but which, if selected for use, would appear to favor the use of the mirror mount of FIG. 4 over the mirror mount of FIG. 3. Actuators 66 and 74 of FIG. 4 are each comprised of an inner cylindrical component 92 which, for the respective actuators 66 and 74, is fixed to pivots 70 and 78, and a mobile outer tubular member 94 which serves as the control linkage members individually identified as 68 and 76. This form for actuators 66 and 74 represents a form of electromechanical actuator taught in U.S. Pat. No. 3,572,136, which is hereby incorporated for reference. A figure representing this known type of actuator with a modification to incorporate an internal position sensing potentiometer will be shown in FIG. 8. Because the mobile part of this type of actuator is the outer tubular member 94, it would be necessary to support the actuators primarily at their lower end. In this circumstance, the actuators are most suitable for use in the mount of FIG. 4, as the magnitude of the wind produced bending forces acting through the control linkages 68 and 76 is substantially less for the mount of FIG. 4 than for the mount of FIG. 3. For types of actuators which can readily be braced to the pedestal, the desirability of bracing the actuators, as can be done using the mount of FIG. 3, and the desirability of achieving lower bending forces, as would occur if the mount of FIG. 4 is used, are offsetting factors which generally make the choice of a preferred type of mount difficult without an actual testing program to evaluate the two types of mounts.

To maintain a fixed rotational position for the outer tubular component 94 of the actuators 66 and 74 of FIG. 4, a pair of alignment rods 96 is fixed to each of the respective pivots 70 and 78. The alignment rods 96 slidably engage a collar and bushing member 98 which is fixed to the outer tubular members 94 of the respective linear actuators 66 and 74. The alignment rods 96 may also provide some reinforcement for the linear actuators 66 and 74 against those wind produced bending forces which are present in the mirror mount of FIG. 4, which act to rotate the linear actuators 66 and 74 out of the planes in which they are nominally constrained to move.

FIG. 4A is a somewhat generalized diagram used to relate the structure of a tilt angle component controlling mechanism similar to those shown in FIG. 4 to the control functions which describe the configuration of the structures. In FIG. 4A, it is assumed that the tilt angle component to be established is $\beta$ and that the mechanism is on the side of the pedestal in the direction of decreasing values of X in the coordinate system of FIG. 1. The results may readily be generalized to other conditions. In the diagram of FIG. 4A, point C represents the center of rotation of the support joint of the mirror mount, and the line C–G represents the pedestal, which is assumed to be oriented perpendicularly to the reference plane in which the mirror pattern is formed. Point D represents the position of a control linkage joint and line C–D, which is of fixed length $L_1$, represents the control arm by which the tilt angle component $\beta$ is established. Point E represents the position of the pivot for the mechanism which establishes $\beta$, and line C–E is of fixed length $L_2$ and makes a fixed angle $\epsilon_1$ with respect to the line C–G. The combination of actuator and control linkage is represented by line D–F which has a variable length $L_v$. As shown in FIG. 4A, line D–F is offset from the pivot at point E by a line E–F which is normal to D–F and has a fixed length $L_3$. For the particular structure shown in FIG. 4, $L_3$ would be zero. However for some actuator structures, it may not be convenient to have the line of motion of the control linkage pass through the pivot point. Also, offsetting point F from the pivot at point E allows the derived expression to cover the possible reversal of roles of the yokes and pivots from that shown in FIG. 4. In the reversed arrangement, the pivots would pass through the pedestal, while the actuators would be rigidly connected to yokes which would pivotally engage the respective pivots, allowing $\epsilon_1$ and $\epsilon_2$ to be made zero. With the control arm, line C–D, in the position shown, the tilt angle component is positive and the variable length $L_v$ may be shown to be equal to $(L_1^2 + L_2^2 - L_3^2 + 2L_1L_2\sin(\beta - \epsilon_1))^{\frac{1}{2}}$. As it is not necessary to keep track of multiplicative constants, the control function may be simplified to $(A_1 + \sin(\beta - \epsilon_1))^{\frac{1}{2}}$, where $A_1$ has the value $(L_1^2 + L_2^2 - L_3^2)/2L_1L_2$. Had the mechanism been placed on the opposite side of the pedestal, the control function would have been $(A_1 - \sin(\beta + \epsilon_1))^{\frac{1}{2}}$.

In computing the intrinsic errors for the control functions associated with the mechanisms depicted in FIG. 4, for columns of mirrors oriented in the north-south direction and rows in the east-west direction, the positions of the complementary actuators for each mount were usually correlated, with either the actuators controlling the east-west tilt being placed on the side of the pedestal nearest the radiation receiver and the actuators controlling the north-south tilt being placed on the south side of the pedestal, or with the positions of all the actuators being reversed. When $\epsilon_1$ and $\epsilon_2$ were set equal to zero in the control functions, placing the east-west actuators on the side of the pedestal nearest the radiation receiver and the north-south actuators on the south side of the pedestal produced slightly lower overall intrinsic errors than the reversed positioning. With $\epsilon_1$ and $\epsilon_2$ given values of 0.1 radian or 0.2 radian, however, the slightly preferred position was with the east-west actuators away from the radiation receiver, and the north-south actuators on the north side. The differences, however, were quite small, and any of the placements of the actuators would be acceptable.

Figure 6:
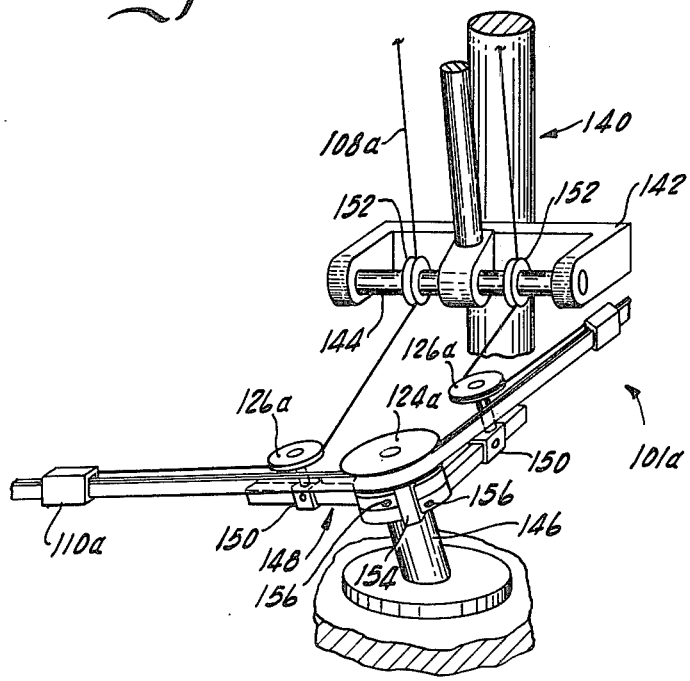
FIG. 6 illustrates a connection arrangement for linking a tensile elastic coupling device to a passive linear actuator similar to that shown in FIG. 5, when employed in a generalized row and column mirror pattern established on non-plane terrain.
Figure 5:
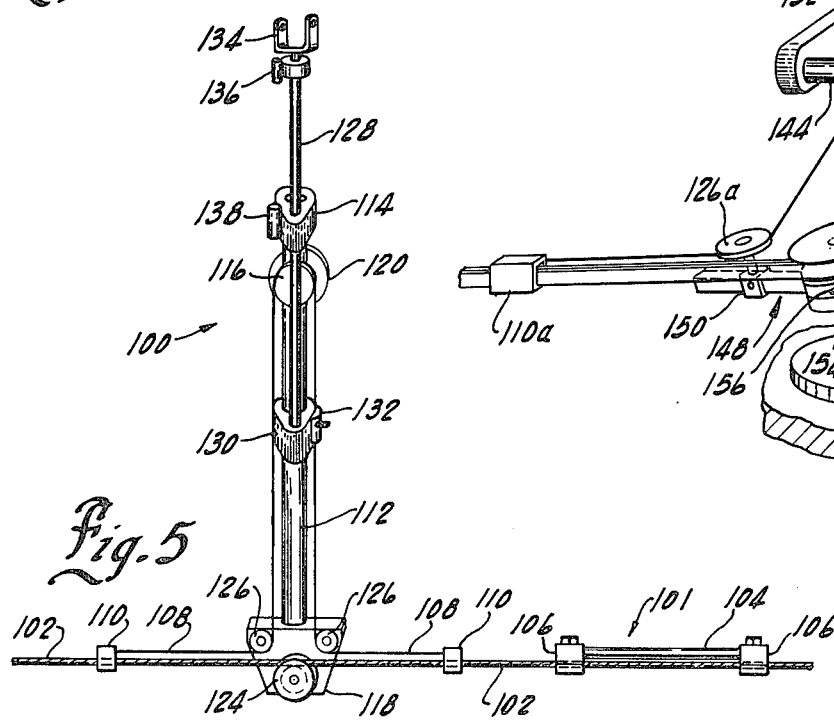
FIG. 5 illustrates a passive linear actuator linked to a tensile elastic coupling device of graded compliance which provides the motive force for the passive actuator. Connections shown between the passive actuator and the tensile elastic coupling device are appropriate for use in the idealized mirror pattern of FIG. 1 consisting of perfectly straight rows and columns.
Figure 7:
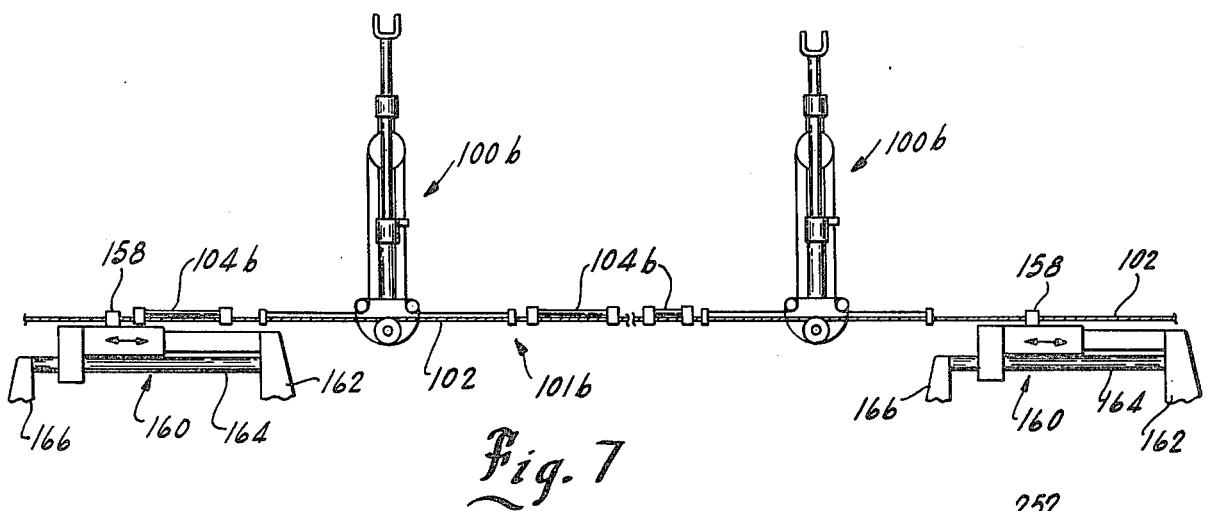
FIG. 7 illustrates the means for establishing positional information on a tensile elastic coupling device using active actuators at the control points.

Referring now to FIGS. 5 through 7, there is illustrated the means by which a simple tensile elastic coupling device, comprised of a high strength cable or belt, can actuate a type of passive linear actuator and control linkage combination which is suitable for use in the mirror mounts of either FIG. 3 or FIG. 4. For simplicity in connecting the elastic coupling device to the mirror mount actuators, this type of coupling device may most readily be used in a mirror pattern generally corresponding to the row and column mirror pattern of FIG. 1. Throughout FIGS. 5 through 7, the actuators and coupling devices for control of only a single tilt angle component are shown. It is to be understood that each mirror mount must include two orthogonally oriented actuators.

In FIG. 5, there is shown a passive linear actuator 100 and a short segment of an elastic coupling device 101 appropriate for use in an idealized mirror pattern consisting of perfectly straight rows and columns. The elastic coupling device 101 is in this case comprised of a highly stressed primary cable 102, which is reinforced at intervals by stiffening members 104, of which one is shown in FIG. 5. The stiffening member 104, which is attached to the primary cable 102 by appropriate clamps 106, has the function of modifying the average tensile compliance of the elastic coupling device 101 over a particular interval. The stiffening member 104 may be a length of cable or a solid rod or bar. At each mirror mount position, a length of secondary cable 108 is fixed by clamps 110 to the primary cable 102 at points on either side of the linear actuator 100. The linear actuator structure includes a main structural column 112, which is shown for simplicity as singular but for which there would be some motivation to replace by a spaced pair of columns. The structural column 112 carries an upper fixed bushing 114, an upper pulley 116, and a lower plate 118. An optional rotary motion damper 120 containing a high viscosity material is fixed to the main structural column 112 at the same level as the upper pulley 116. The upper pulley 116 is linked by a common shaft, not shown, to a rotatable plate inside the rotary motion damper 120. The lower plate 118 carries a main pulley 124, which engages the primary cable 102, and a pair of secondary cable takeoff pulleys 126, which primarily engage the secondary cable 108. The takeoff pulleys 126 keep the secondary cable 108 parallel to, and essentially in contact with, the primary cable 102 outside of the takeoff pulleys 126, and allow it to loop up and over the upper pulley 116 between the takeoff pulleys 126. A control linkage rod 128 is slidably engaged by the upper fixed bushing 114 and is rigidly fixed to a mobile bushing 130 which slidably engages the main structural column 112. The mobile bushing 130 is fixed to the secondary cable 108 between the upper pulley 116 and one of the secondary cable takeoff pulleys 126 by a clamp 132. The secondary cable 108 may be wrapped once around the upper pulley 116 to provide good coupling between the secondary cable 108 and the rotary motion damper 120, in order that forces generated by wind gusts may be partially absorbed by the rotary motion damper 120 and not propagated to the primary cable 102. Fixed to the upper end of the control linkage rod 128 is a yoke 134 which forms part of the linkage joint to a control arm of the mirror mount. Immediately below the yoke 134, there is fixed an upper calibration stop 136. A lower calibration stop 138 is fixed to the upper fixed bushing 114. The upper and lower calibration stops 136 and 138 are used to gauge the proper point at which to connect the mobile bushing 130 to the secondary cable 108, as will be explained with reference to FIG. 7.

The property of having perfectly straight rows and columns, which would be required for using the pulley arrangement shown in FIG. 5, is unrealistic for a large scale collector. The manner in which pulleys may be arranged to use a highly tensioned elastic coupling device when the rows and columns are irregular, due to uneven terrain, is shown in FIG. 6. In FIG. 6, the main pulley 124a, which engages the highly tensioned elastic coupling device 101a, and the secondary cable takeoff pulleys 126a are shown to be removed entirely from the mirror mount 140, which is represented by a short section of a mount of the type shown in FIG. 4, including a yoke 142 and actuator pivot 144. The main pulley 124a and the secondary cable takeoff pulleys 126a are carried by a short post 146 which is firmly anchored in the ground at a short distance from the mirror mount 140. Prior to installing the posts 146, the proposed course of the elastic coupling device 101a is determined with a stretched string which passes close to each mirror mount on the row or column. The post 146 is installed so that the main pulley 124a is: (1) close to the actuator pivot 144, (2) lies along a line perpendicular to the pivot 144, and (3) lies in the plane containing the course of the elastic coupling device 101a on each side of the pulley 124a. It is preferable that the highly tensioned elastic coupling device 101a in this case not be a cable but rather that it be a belt made up of many separate layers of a thin high strength elastic material, as this structure can be more highly tensioned than can a cable when the elastic coupling device 101a is carried to bend in its contact with the main pulley 124a. Thin layers of a polymer tape containing aligned fibers of glass or other high strength elastic material would be a desirable material for the elastic coupling device 101a. The secondary cable 108a is attached to the coupling device 101a by means of clamps 110a. Because the coupling device 101a is to be made up of many separate layers of material, the tensile compliance can be varied in small increments by adding extra layers where desired. It would be desirable to construct the clamps 110a, which connect the secondary cable 108a to the coupling device 101a, in such a manner that they may also be used to clamp the additional layers of high strength material to the coupling device 101a. The secondary cable takeoff pulleys 126a are each mounted on separate bar and ring components 148, with each ring rotatably engaging the post 146. Each secondary cable takeoff pulley 126a is mounted on an individual movable clamp 150 which engages the bar portion of one of the bar and ring components 148. The positions of the takeoff pulleys 126a is adjusted so that the path of the secondary cable 108a to and from the mirror mount 140 lie generally in the planes of a pair of lower actuator pulleys 152 which are mounted on the actuator pivot 144, while the secondary cable 108a is essentially in contact with the coupling device 101a outside the takeoff pulleys 126a. After the takeoff pulleys 126a are properly positioned, the ring portions of the bar and ring components 148 are clamped together by a clamp 154 and the combination is fixed to the post 146 by set screws 156. When using tensile elastic coupling devices to control fixed linear actuators of a mirror mount of the type shown in FIG. 3, it would be possible to rotate each actuator, including a pair of lower actuator pulleys similar to the pulleys 152 of FIG. 6, to a position which best facilitates the connection to a coupling device if the mirror mounts are to be used in circular paths or other paths of high average curvature.

FIG. 7 illustrates the means by which the proper positional information is to be established on the type of tensioned elastic coupling device represented in FIGS. 5 and 6. For simplicity, the idealized linking arrangement of FIG. 5 will be used in FIG. 7, rather than the more realistic linkage shown in FIG. 6. Two passive linear actuators 100b are shown. These represent the actuators on the terminal mirror mounts of an interval of path between secondary control points. Additional passive mirror mount actuators would be positioned on the path between the two shown, and each would be engaged by the elastic coupling device 101b. The elastic coupling device 101b is in turn engaged by clamps 158 attached to active linear actuators 160. Each active linear actuator 160 has the function of properly positioning the tensile elastic coupling device 101b at the control points established by the presence of the actuators 160. The actuators 160 shall be assumed to be the type of electromechanical linear actuator taught in U.S. Pat. No. 3,572,136 and previously referred to in FIG. 4; although other actuators may be used. This type of actuator may be controlled by appropriate feedback elements in a servo-system. The actuators 160 are to be aligned parallel to the course of the elastic coupling device 101b and are to be anchored to the ground at one end by a short stanchion 162. The movable portion of each actuator 160 is to slide along a support rod 164 which is anchored at one end to the stanchion 162 and at the opposite end to a second stanchion 166.

In a large scale collector using elastic coupling devices for direct mirror actuation, the requirement that wind forces not produce excessive mirror alignment errors will require that the control point actuators 160 of FIG. 7 be placed much closer together than would be required simply to keep the intrinsic errors of the coupling approximation under one milliradian. For this reason, the coefficients used for designing the coupling devices over the interval between control point actuators 160 do not need to be determined with great accuracy. Evaluation of the expression $(1 - \cos\pi l_m/2L)$ would give adequately good coefficients for use with relatively closely spaced control actuators in a mirror array not greater than 4h×4h in size. However the coefficients should be used to determine the positional variation of compliance over each interval between control actuators 160 individually, as continuing the positional variation smoothly over the entire length of a row or column in a large scale collector would result in the low compliance portion being very unwieldly. Therefore in expressing the compliance between adjacent mirror positions m and m', which in this approximation is $C(\cos\pi l_m/2L - \cos\pi l_{m'}/2L)$, the constant C should be a constant of proportionality which is specific to an interval between a particular pair of control point actuators 160. For equally spaced mirrors, this expression is larger near the outer control point and smaller near the inner control point. In FIG. 7, the control point actuator 160 on the left hand side of the page is at the inner control point of the pair shown, as evidenced by the fact that the stiffening members 104b are of greater length on the left hand side.

Because the positional variation in compliance has been made specific to each particular interval between pairs of control point actuators 160, the tension which must be applied to the coupling device will generally also be specific to each interval. However, one particular value of tension will be used for calibration purposes and will be applied simultaneously to all intervals of the coupling device. In order to initially calibrate the tensile elastic coupling device on a given row or column, the clamp 132 of FIG. 5, which fixes the control linkage rod 128 to the secondary cable 108, is loosened on all mirror mount actuators 100 which engage the coupling device on that row or column, and the clamps 158 of FIG. 7 are loosened on all control point actuators 160. The control linkage rods 128 of all actuators 100 are brought to the same position, either with the upper calibration stop 136 and the lower calibration stop 138 of each actuator in contact, or with equal length calibration bars, not shown, inserted between the calibration stops. Use of calibration bars which would establish a zero tilt angle would be desirable if rows and columns are simultaneously calibrated, while direct contact of the upper calibration stop 136 and the lower calibration stop 138 is satisfactory if rows and columns are calibrated individually. The control linkage rods 128 should be temporarily clamped in the uniform calibration position by appropriate clamping means, not shown. All the control point linear actuators 160, of FIG. 7, are brought to a uniform position corresponding to the calibration position of the control linkage rods 128 of FIG. 5, and an appropriate uniform tension, intermediate between the upper and lower values which are to be employed, is established on the entire length of the coupling device. The clamps 132 of FIG. 5 and 158 of FIG. 7 are then tightened and the control linkage rods 128 released from their calibration position.

It is instructive to examine a specific numerical example which relates the properties of a tensile elastic coupling device to the expected stiffness of the mirrors against wind forces and to the required height of the radiation receiver. The relationships are most readily analyzed for the mirror mount of FIG. 3, which uses the tangents of the tilt angle components as control functions, so the example will relate specifically to that mount. The tensile elastic coupling device must always be used within the elastic limits of the high strength material used in the coupling device. The amount of extra stretching required per unit length, beyond that imposed during calibration of the device, will be equal to the product of the perpendicular distance from the center of rotation of the support joint to the line of motion of the control linkage rod in the mount of FIG. 3 multiplied by the rate of change of the tangent function with position on the path. If the columns of mirrors in the pattern of FIG. 1 are oriented in the north-south direction, the greatest rate of change of tangent function encountered will occur for the east-west tilt angle controlling function in the region near the ends of the columns in the vicinity of the north-south directed axis of symmetry. For a mirror array which is 4h×4h in size, with a centered radiation receiver, and for sun tracking which terminate when the cosine of the zenith angle is less than 0.1, the rate of change of the tangent function with position will not be greater than roughly 0.6/h. To find the smallest allowable height for the radiation receiver, it would be reasonable to equate the product of 0.6/h times the separation between the support joint and the control linkage rod in the mount of FIG. 3 to one third of the value of the largest strain which the material used in the coupling device may safely withstand. The coupling device would then be calibrated at a stress level of two thirds of the maximum value which is to be used, and during operation the stress level would vary above and below the calibration value by not more than one third of the maximum allowed value. (The residual tension in the coupling device in its most slackened operational condition should be greater than the sum of the maximum stress due to changes in ambient temperature plus a reasonable allowance for wind produced forces acting on the mirrors in an individual interval of the coupling device.) Assuming a separation of 0.3 meters between the support joint and the control linkage rod in the mirror mount of FIG. 3 and an allowed maximum change in length of one half of one percent for the material used in the tensile elastic coupling device would yield a minimum height for the radiation receiver of 108 meters. If this minimum height were used, the 4h×4h mirror field would be 432 meters on a side and the distance between essential control points would be 216 meters. For purposes of the example, the effects of dividing the 216 meter distance between essential control points into eight 27 meter intervals for secondary control will initially be considered. Later the effect of further dividing each interval in half will be examined. Looking specifically at the intervals at the ends of the coupling device which extends along the north-south axis of symmetry when this coupling device is under conditions of maximum allowed strain (The sun would be roughly 6° above the horizon and due east or due west), it would be found that the tangent function varied along the 27 meter intervals at each end of the column of mirrors by roughly a value of 0.15. The value of the east-west tilt angle component in these intervals is roughly 60° and at this angle the 0.15 variation in tangent corresponds to roughly a 37 milliradian vibration in tilt angle component over the intervals being considered. As an example of appropriate characteristics for a coupling device for direct mirror actuation, one might choose a primary tensile member which could be calibrated while subject to a tension of 5,000 kilograms-force and which would provide the maximum required rate of variation of the control function by varying the tension by 2,500 kilograms-force above or below the calibration value. For the particular case considered, the variation of 2,500 kilograms-force would have to produce a 0.15 variation in tangent function corresponding to a 37 milliradian variation in tilt angle component over the intervals, so the immediate end-to-end stiffness of the end intervals of the coupling device could be said to be about 67.5 kilograms-force per milliradian. However, when the coupling device is clamped at the ends of the interval, the effective stiffness, in terms of the amount of force which may be uniformly exerted along the interval to produce one milliradian error in tilt angle component for mirrors near the center of the interval, is substantially greater than the end-to-end stiffness. The ratio of the effective stiffness to the end-to-end stiffness will vary somewhat with the number and position of the mirrors on the interval, but will typically be about 6.5. For the particular case being considered, roughly 440 kilograms-force could be exerted on the coupling device by the mirrors on the end intervals before the mirrors near the center of the intervals would acquire a one milliradian error in tilt angle component. However, the effective stiffness, expressed in kilograms-force per milliradian, for an elastic coupling device used with the mirror mount of FIG. 3 will vary markedly, depending on the ratio of the change of tilt angle component to the change in value of the tangent function for the particular value of tilt angle component which has been established. The wind produced torques on the mirrors which lead to forces on the coupling devices are generally maximum when the mirrors are tilted at 45° to the horizontal. For a 45° tilt angle component, the effective stiffness of the coupling device being considered would be roughly 220 kilograms-force per milliradian for the end intervals. For intervals of the coupling devices which are interior to the end intervals, local reinforcement of the primary tensile member, required to produce the appropriate variation of compliance, will generally be progressively greater than for the end intervals, resulting in a somewhat higher effective stiffness.

The effective stiffness calculated in the above example is sufficiently high to allow elastically coupled mirrors to be used in at least moderate winds. However, a detailed calculation of the maximum permissible wind velocity is beyond the scope of this analysis, and it is not clear that the computed effective stiffness is acceptable for a large scale collector. Also, the stiffness is not so high as to keep unbalanced gravitational forces on the mirrors from producing significant alignment errors if the center of gravity of the mirror structure is substantially displaced from the center of rotation of the support joint. For this reason, it is desirable to have the mounting plate of elastically coupled mirror mounts positioned closer to the center of rotation of the support joint than is shown in FIGS. 3 and 4. If one control arm which is shown in these figures to be fixed to the socket component of the support joint is instead fixed to the mounting plate, which is in turn fixed to the socket component, the structure may be made more compact in the vertical direction than is shown.

If the 27 meter intervals in the above example are divided in half by inserting an extra control point actuator at the midpoint of each of the orginal intervals, the effective stiffness of the coupling device over each new interval would be essentially double the stiffness of the device over the original intervals, while the number of mirrors on which wind forces would be acting on each new interval would be only half as great as for the original intervals. In this case, it appears that a coupling device, having the properties described in the example, would be sufficiently stiff to cope with both relatively high wind forces and reasonable unbalanced gravitational forces without producing excessive alignment errors for mirrors with dimensions of 2 to 3 meters.

There are also other important changes which occur as the length of the control interval is reduced. With the sun due east or west and 6° above the horizon, as in the example, the maximum misalignment in the east-west tilt angle component of the mirrors which would be produced at the midpoint of any of the original intervals if the compliance of the coupling devices was left uniform, rather than being modified according to the difference between coefficients, would be between 4 and 5 milliradians. If the compliance on the original intervals is established according to approximate coefficients obtained by evaluating the expression $(1-\cos \pi 1_m/2L)$, the maximum intrinsic error at the midpoint of the original intervals is reduced to a relatively small fraction of one milliradian. The benefit of modifying the compliance is clear. However, when the interval length is reduced from 0.25h to 0.125h, the maximum error in east-west tilt angle component which would be produced at the midpoint of any interval due to the use of a coupling device having uniform compliance would be roughly one milliradian. As this is for a rather extreme sun position, and as most intervals would have substantially less than one milliradian error produced by the use of a coupling device of uniform compliance, it would appear to be unnecessary to modify the compliance over much of the array. It is the inner intervals on the coupling devices which would produce the largest errors if the compliance were left uniform, and these intervals alone may be modified.

A further effect of reducing the interval length from 0.25h to 0.125h is that the force generating requirements of the control point actuators 160 in FIG. 7 are essentially cut in half. The force generating requirement of each control point actuator, except possibly those at the ends of the rows and columns, will be equal to the sum of the maximum expected force due to the wind which will act on one interval of the coupling device plus a fraction of the maximum variation of tension from the calibration value. The fraction of the variation in tension applied to the coupling device which must be included in the force generating capabilities of the individual control point actuators will depend somewhat on the design of the coupling device, but will generally be inversely proportional to the number of control point actuators used on each row or column.

At the ends of each row and column, the elastic coupling device may be terminated by being connected to a high force generating actuator such as a servo-controlled block and tackle. However, the coupling devices of adjacent rows or columns may also be extended around well anchored pulleys and joined in continuous loops. In order for this to be done, the secondary cable 108 of FIG. 5 would have to be clamped to the opposite side of the mobile bushing 130 on alternate rows or columns for all passive actuators 100 which engage the coupling device. The rows or columns so joined should be simultaneously calibrated.

If tensile elastic coupling devices are to be used in collector systems which are small compared to the size considered in the numerical example given above it would be desirable to utilize materials capable of withstanding a particularly large elastic strain in the portion of the coupling devices near the ends of the rows and columns. However the greater required rate of change of compliance with position in a smaller collector would tend to make the coupling devices unwieldy near the intersections with the symmetry axes if the compliance variation is produced solely by varying the cross section of the coupling devices. It would therefore be desirable to vary the effective modulus of tensile elastic coupling devices used in collectors of modest scale. Some materials which appear to be promising would be glass fiber composites for the portions of the coupling devices which must withstand high strain, with stiffening by carbon fiber composites near the intersections with the axes of symmetry. (It may be noted that in the case of torsional coupling devices which shall be described for use in small scale collectors the problem of excessive spatial variation in the bulkiness of the coupling devices is greatly reduced because of the more rapid variation of torsional compliance with cross section dimensions.)

Figure 8:
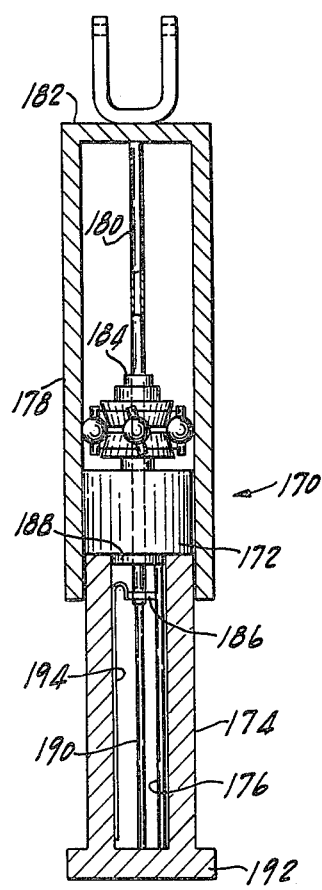
FIG. 8 is a cross section view illustrating a known type of electromechanical linear actuator, modified to include a position sensing potentiometer for servo control of the active actuator.

Referring now to FIG. 8, there is represented, in cross section, a linear actuator 170 of the type taught in U.S. Pat. No. 3,572,136, which has been used as an example of a form of actuator appropriate for use directly on mirror mounts or as the control point actuators for a tensile elastic coupling device. The operation of this actuator depends on a plurality of ball bearings being squeezed between an inner rotatable member and an outer tubular member, with means provided for forcing the axes of rotation for the bearings to be canted slightly with respect to the common axis direction of the inner rotatable member and the outer tubular member. In FIG. 8, the basic actuator is shown modified to include an internal position sensing potentiometer, as would be appropriate if the actuator is to be controlled by a voltage provided by a resistive coupling device. To allow the relatively long stroke length required, the actuator motor 172 should be fixed to a rugged cylindrical extension 174. If an internal position sensing potentiometer is to be used, the extension 174 should be tubular in nature and should contain the potentiometer resistance element 176. The outer tubular 178 of the actuator 170 fits snuggly over the motor 172 and extension 174. A small diameter tube 180 is fixed to an end cap 182 on the outer tubular member 178 and extends through a hole in the motor shaft 184 into the extension 174, where it carries the potentiometer wiper 186. The wiper carrying tube 180 is supported by a bushing 188 which is fixed to the end of the actuator motor 172 and by a support rod 190 which is fixed to an end plate 192 of the extension 174 and which fits snuggly into the wiper carrying tube 180. The electrical lead to the potentiometer wiper 186 is conducted along a folded flat spring element 194 to an external connection, not shown. Ancillary instrumentation, not shown, required for each voltage controlled actuator of the type shown in FIG. 8 would include: a sensitive differential amplifier to detect any error between the control voltage an the voltage appearing at the potentiometer wiper 186, a power amplifier to drive the actuator motor 172 in response to any error signal detected by the differential amplifier, and a voltage source which would be applied across the potentiometer resistance element 176. It would normally be possible to supply the position sensing potentiometers of a number of actuators with a single voltage source. Other types of linear actuators such as hydraulic actuators or mechanical lead screws could also be used in a voltage controlled mode by employing appropriate external position sensing potentiometers.

Figure 9:
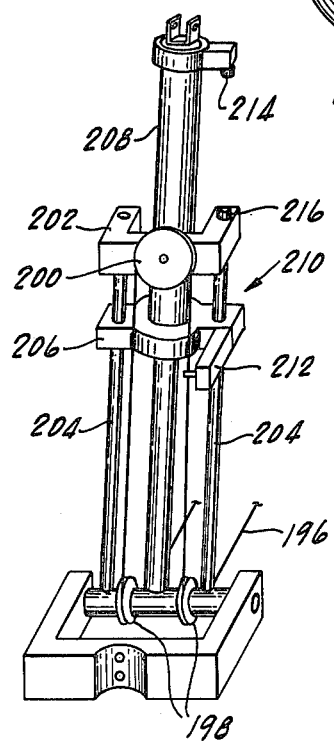
FIG. 9 illustrates the use of a tensile elastic coupling device, similar to that developed in FIGS. 5 through 7, as a means for actuating a control transducer which controls an active actuator adapted for use on an individual mirror mount.

Referring now to FIG. 9, there is represented a form of the invention in which a highly tensioned elastic coupling device, as developed in FIGS. 5 through 7, is used to control active linear actuators on the individual mirror mounts rather than actuating the mirrors directly. Use of the elastic coupling device in this way isolates the coupling device from wind produced forces and allows the use of a lighter duty coupling device over longer control intervals than is appropriate when a coupling device is used for direct actuation of the mirrors. The ancillary control components required for this type of control appear to generally be simpler and less costly than those required for use with voltage controlled actuators on the individual mirror mounts.

In FIG. 9, a secondary cable 196, which is connected to a tensile coupling device, not shown, is conducted under a pair of lower actuator pulley 198 and over an upper actuator pulley 200 which is mounted on an upper mounting plate 202. The basic actuator structure shown in FIG. 9 is that depicted in FIG. 4, incorporating the actuator of FIG. 8 but without the potentiometer components. The upper mounting plate 202 is carried by a pair of alignment rods 204. The alignment rods 204 are slidably engaged by a collar and bushing member 206 which is fixed to the mobile tubular member and control linkage 208 of the linear actuator 210. The collar and bushing member 206 carries a control transducer 212 which, for the type of actuator shown, could appropriately be an electrical reversing switch having a neutral center position, for controlling a D.C. actuator motor, or a three-way pneumatic directional control valve with a closed center position, for controlling a reversible pneumatic actuator motor. The control transducer 212 engages and is actuated by the secondary cable 196. The power lead connections, not shown, which must be provided to the transducer 212, could be made by coupling the leads to a folded flat spring element similar to the element 194 of FIG. 8, with a guide, not shown, added to the structure to provide a backing for the folded spring element. The control transducer 212 is to be initially engaged to the secondary cable 196 when an upper calibration stop 214 and a lower calibration stop 216 are in contact and the control actuators, not shown, for the elastic coupling device to which the secondary cable 196 is connected, are in a corresponding position. In order to control the linear actuator 210 so that the control linkage 208 accurately follows the motion of the secondary cable 196, the control transducer 212 must be quite sensitive to small positional changes of the secondary cable 196 relative to the transducer 212. However, the force available at the point of engagement of the control transducer 212 to the secondary cable 196 as a result of small positional changes may be quite substantial, and displacement amplifying lever action may be incorporated into the transducer mechanism if desired. A possible transducer means, for use with a D.C. electric actuator motor, which would produce very little loading of the elastic coupling device would be comprised of a pair of phototransistors, an internal light source, and a small mirror carried by a small diameter rotatable shaft. By coupling the rotational position of the small shaft to the relative displacement of the secondary cable 196 with respect to the transducer 212, the mirror would direct light onto one or the other of the phototransistors, which would switch current of the appropriate polarity to the actuator motor to drive the mobile tubular member 208 in the proper direction.

Hydraulic mirror mount actuators could also be controlled with tensile elastic coupling devices, using an arrangement similar to that shown in FIG. 9, by placing the control transducer, which in this case would be a four-way valve, on an outrigger extension which would project from the top of the control linkage, back along the body of the hydraulic actuator. The very low flow rates required would allow the use of very small diameter flexible hydraulic tubing for connecting to the valve.

Figure 10:
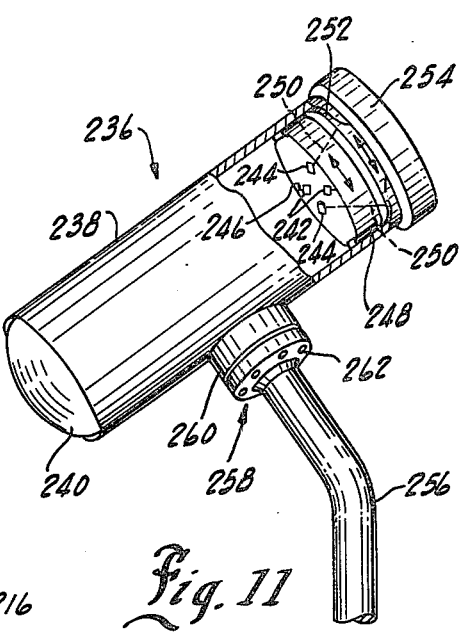
FIG. 10 is a cross secton view illustrating a position adjusting socket intended to facilitate proper alignment of a mirror mount pedestal.

Referring now to FIG. 10, there is illustrated a mounting structure intended to facilitate the proper positioning of a mirror mount pedestal, as is required for the mirror mounts of this invention. There is shown a segment of a mirror mount pedestal 220, a cross section of a position adjusting socket 222, and a segment of a post or piling 224 which is fixed to the position adjusting socket 222 and which is embedded in the earth to provide a stable base for the mirror mount. The pedestal 220 is shown to have a bulbous end 226, which fits into the position adjusting socket 222, and to be fitted with a cap 228 for the position adjusting socket 222. The cap 228 has an opening through which the pedestal 220 fit, and is fastened to the positon adjusting socket 222 by means of screws 230. The fit of the bulbous pedestal end 226 in the position adjusting socket 222, and of the pedestal 220 in the opening in the cap 228 should allow sufficient freedom of movement to allow the pedestal 220 to be shifted in position to achieve proper alignment. Alignment is indicated when the pedestal 220 is vertical and an alignment groove 232, with respect to which the mirror mount actuators, not shown, are oriented, is accurately facing one of the axes of symmetry for the mirror pattern. Once the pedestal 220 is aligned, a thermoplastic material is to be injected into an injection port 234 in the position adjusting socket 222 in order to lock the pedestal 220 in place.

Because of the large number of mirror mounts which must be individually aligned with considerable precision in this concept of the large scale collector, the alignment should preferably be carried out by servo-controlled semi-automatic aligning machines. A possible procedure for servo-controlled aligning of the pedestals would utilize a large mobile alignment mirror which could be moved to various positions in the mirror field, carefully aligned parallel to one of the symmetry axis directions for the mirror pattern, hung in a plumb position, and protected from the wind by a transparent housing. The servo-controlled aligning machine would sequentially be engaged to individual pedestals and would stand the pedestal being aligned accurately upright as indicated by gravity sensing tiltmeters. A laser on the aligning machine would be engaged to the pedestal in such a way that the laser beam would be perpendicular to the pedestal 220 and tangent to the alignment groove 232. The pedestal would be rotated until the laser beam was reflected from the large alignment mirror onto a sensor array surrounding the beam source, after which the alignment would be servo-adjusted until the laser beam was accurately reflected back on itself. The alignment machine would hold the pedestal 220 in this orientation while the thermoplastic material was injected into the position adjusting socket 222 and allowed to cool.

Figure 11:
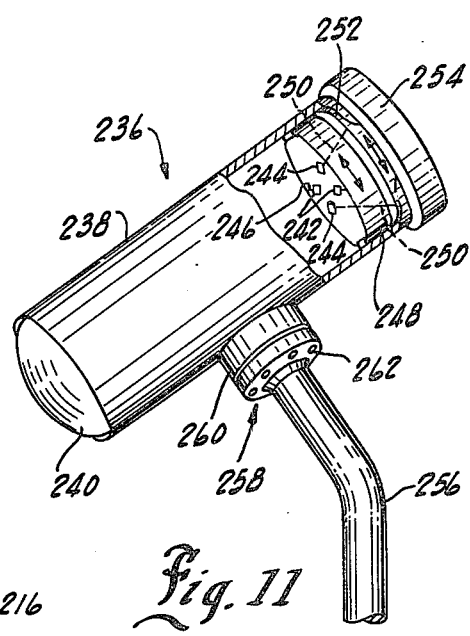
FIG. 11 illustrates an electro-optical sensor having pairs of sensing elements which are adapted for independent rotational positioning about the optic axis of the sensor, as is appropriate for monitoring mirrors controlled about fixed orthogonal axes.

Referring now to FIG. 11, there is shown an example of an electro-optical sensor 236 which may be used to monitor the reflected beam from a mirror having its motion controlled about fixed orthogonal axes of resolution. The use of electro-optical sensing elements as feedback means for orienting heliostat mirrors is well known and may be found described, for example, in U.S. Pat. No. 2,712,772. However, the use of fixed axes of resolution for mirror control in the present invention appears to require a distinctly different alignment of the sensing elements of an electro-optical sensor than would be used for conventional mirror mounts. The sensor 236 of FIG. 11 includes a tubular body 238, part of which is cut away for viewing internal components, and a lens 240 having a focal length comparable to the length of the tubular body 238. The sensor 236 is mounted with the tubular body 238 aligned in the direction of the aiming point associated with the radiation receiver. Near the end of the tubular body 238, opposite the lens 240, the sensor 236 contains a first pair of photosensitive elements 242 symmetrically positioned with respect to the axis of the tubular body 238, which forms the optic axis of the sensor 236. A second pair of sensing elements 244 are also symmetrically positioned with respect to the optic axis of the sensor 236. It shall be assumed, without proof, that the optimum arrangement of the pairs of sensing elements 242 and 244, for use with mirrors which are controlled about fixed axes of resolution, would have a line joining the first pair of sensing elements 242 contained in a plane which is orthogonal to one of the axes of resolution, and a line joining the second pair of sensing elements 244 contained in a plane which is orthogonal to the complementary axis of resolution. The sensor 236 intended for use with the invention is structurally distinct in that the positional requirements which have been placed on the pairs of sensing elements 242 and 244 will require that the individual pairs of sensing elements 242 and 244 each be oriented within the tubular body 238 in a specific manner which will depend on the position within the mirror array of the mirror which is to be monitored by the sensor 236.

To allow the specific adjustment of each sensor 236 for its particular position in the mirror array, the first pair of sensing elements 242 are attached by radially directed pins 246 to a first alignment ring 248, which may be rotated within the tubular body 238, while the second pair of sensing elements 244 are attached by obliquely directed pins 250 to a second alignment ring 252, which may be independently rotated within the tubular body 238. To facilitate adjustment, the tubular body 238 is provided with an easily removable end cap 254 to allow access to the alignment rings. For a sensor 236 which is to monitor a mirror which corresponds to position (x,y,0) in the reference plane, the particular alignment ring which carries the pair of sensing elements intended to monitor the tilt angle component $\beta$ should be rotated within the tubular body 238 until the line joining the sensing elements makes an angle of $\cos^{-1}(xS/R(h^2+x^2)^{\frac{1}{2}})$ with respect to the vertical plane containing the optic axis of the sensor 236. (The uppermost sensing element of the pair should be on the side of this vertical plane nearest the X axis of the coordinate system.) The corresponding alignment for the sensing elements which are to be sensitive to errors in the tilt angle component $\gamma$ would be at an angle of $\cos^{-1}(yS/R(h^2+y^2)^{\frac{1}{2}})$ from the vertical plane containing the axis of the sensor 236, with the uppermost sensing element of the pair lying on the side of this vertical plane which is nearest the Y axis of the coordinate system. In order that the optic axis of the sensor 236 may readily be directed toward the desired aiming point, the sensor 236 is fixed to a mounting post 256 by means of a ball and socket joint 258 having a split socket 260. The two parts of the socket 260 are joined by screws 262 which are threaded only in the region of the ends. To align the sensor 236, a telescopic sight would temporarily be clamped onto the tubular body 238 and directed toward the aiming point, whereupon the screws 262 would be tightened and the telescopic sight removed.

Throughout the analytical and computational analysis of the analog coupling mirror control system, it was assumed that all mirrors were to be oriented to reflect solar radiation toward a single aiming point which was located on the Z axis of the coordinate system used in establishing the mirror pattern and at a height h above the X-Y plane. However, the use of a very large number of individually relatively small heliostats in this concept of the large scale central receiver collector would, if directed toward a single aiming point, yield a higher radiation flux at the radiation receiver than would be the case for other central receiver collector concepts. As available materials for the radiation receiver may not be able to withstand this higher flux, it may be necessary to direct different mirrors toward slightly different aiming points. For the circular mirror pattern of FIG. 2, this may readily be accomplished by programming the primary control system to direct the reflected beams from mirrors in different circular paths toward aiming points at slightly different elevations along the Z axis. Determining the the effects of using different elevations for the aiming point in establishing the values of the control functions at the control points on different rows and columns of the mirror pattern of FIG. 1 is a more complex problem. One of the potential advantages of incorporating electro-optical sensors such as shown in FIG. 11 into the primary control system for the collectively controlled mirror array is that sensors in different areas of the array could be aimed toward slightly different elevations on the radiation receiver if it is desired to spread the radiation over a receiver larger than the smallest focal region which could be associated with the mirror array.

For optical sensors 236 which monitor mirrors lying along one of the coordinate axes, the pairs of sensing elements 242 and 244 would be oriented orthogonally to each other and the sensor 236 can monitor the tilt angle component having an essential control point on that coordinate axis without regard to small errors in the complementary tilt angle component. For all other conditions, however, an error in a tilt angle component about one of a pair of fixed axes of resolution does not lead to a unique direction for the deflection of the reflected beam. It is therefore not obvious that sensing elements aligned in the manner described, or in any alternative manner, would be sufficiently correlated with the control of a particular tilt angle component to allow electro-optical correction of the coupled analog quantity to be exercised. Therefore, a series of approximately worst case situations were studied to determine the extent to which each of the pairs of sensing elements 242 and 244 would be associated with the control of a particular tilt angle component. The approximately worst case situations considered were for mirrors at the periphery of the array with the sun on the horizon at positions which required the normal to the mirror to have a particularly large component parallel to the axis of resolution about which there is assumed to be an error. It was found, for example, that for a mirror at a distance of 2h from the origin of the coordinate system along the X axis, an assumed error in the tilt angle component $\beta$ would, under worst case sun position, produce an error of the reflected beam direction which would effect the pair of sensing elements which were to be sensitive to errors in $\gamma$ slightly more than those which were to be sensitive to errors in $\beta$. The error in $\beta$ would lead to an attempt by the feedback system to correct both $\beta$ and $\gamma$, and this attempt would lead to a forced error in $\gamma$. However along the X axis, a small error in $\gamma$ does not effect the $\gamma$ sensitive sensing elements at all, so the error in $\beta$ could eventually be corrected by the appropriate control elements and the forced error in $\gamma$ would then also go to zero. At points along the Y axis, an assumed error in $\beta$ will produce a deflection of the beam which effects only the $\beta$ sensitive sensing elements, and corrective control would be initiated without complication. Along the diagonals of a row and column mirror array, both sets of sensing elements are effected by errors in either tilt angle component. However for a mirror at a corner of a 4h×4h collector, and a worst case sun position, an assumed error in one tilt angle component is found to produce a deflection of the reflected beam which has three times as large a component along the direction of the sensing element pair which is to be sensitive to that tilt angle component as along the direction of the complementary sensing elements. It is believed that the results of the worst case examples indicate that electro-optical sensors, having sensing elements aligned according to the description given, can provide error correction signals which are adequately correlated with individual tilt angle components to function as part of the control system for the collectively controlled mirror array, provided feedback from the electro-optical sensors is applied to both tilt angle components for off-axis monitored mirrors.

Figure 12:
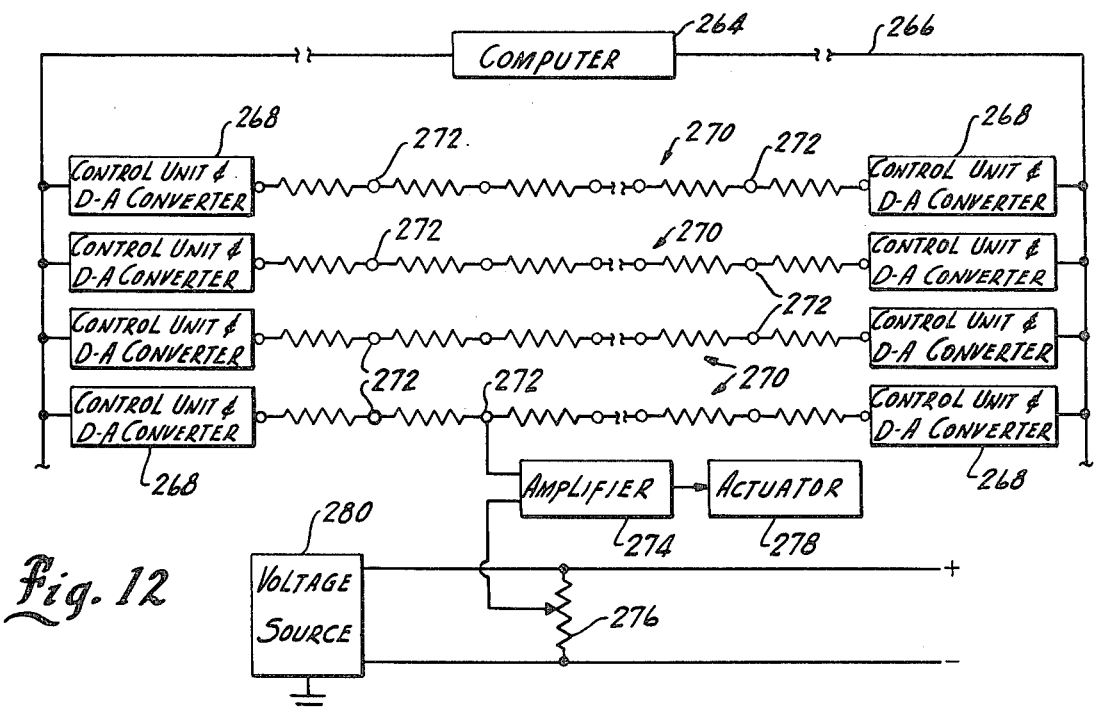
FIG. 12 is a schematic diagram illustrating the components for a computer-based primary control system used in conjunction with resistive coupling devices and voltage controlled actuators.
Figure 13:
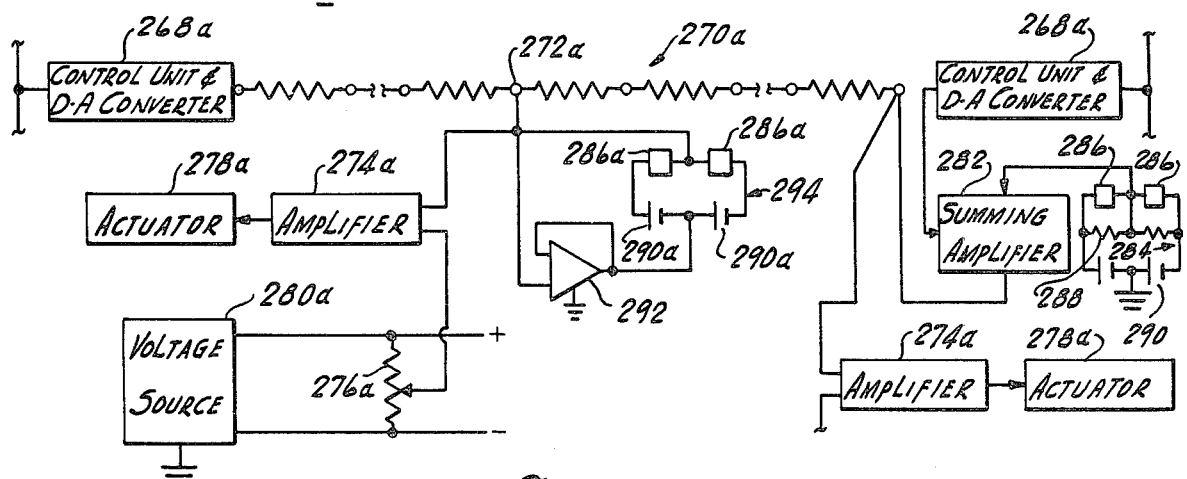
FIG. 13 is a schematic diagram illustrating the manner of use of sensing elements from the electro-optical sensor of FIG. 11 for correcting errors in the voltage values established on a resistive coupling device.
Figure 14:
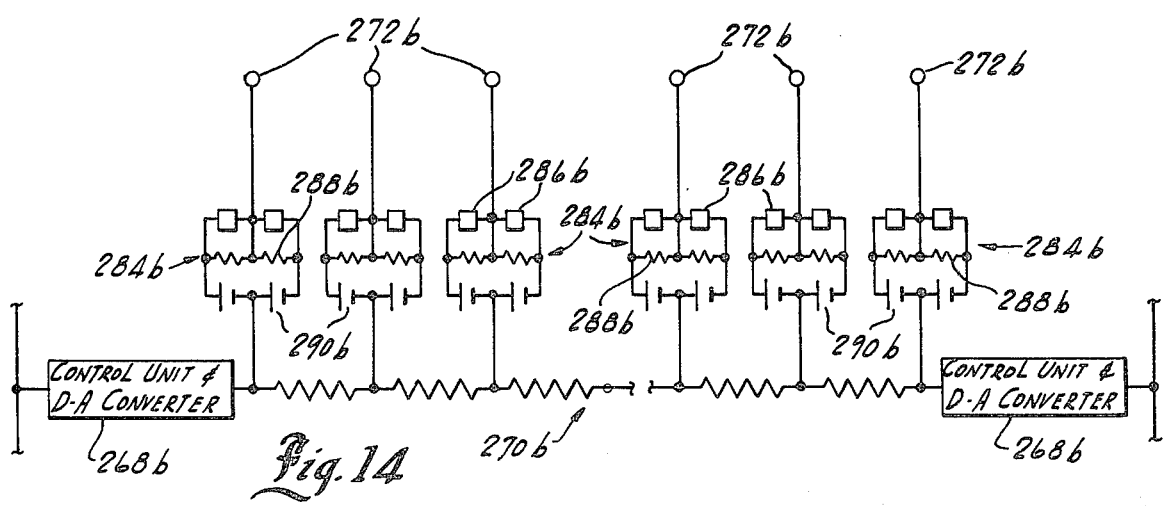
FIG. 14 is a schematic diagram illustrating the manner of use of sensing elements from the electro-optical sensor of FIG. 11 for fine control of voltage controlled actuators, with a resistive coupling device providing coarse control.

Referring now to FIGS. 12 through 14, there is schematically shown variations of a control system using electrical voltages as the analog quantities which are to be coupled along resistive coupling devices on the mirror containing paths. The coupled voltages may potentially be used to control active actuators on every mirror mount, using the voltage controlled actuators of FIG. 8, or other types of actuators coupled to appropriate potentiometer feedback elements. However as elastic coupling, either for direct mirror actuation or for active actuator control by actuation of appropriate control transducers, appears to offer greater opportunity for providing economical control of small mirrors, it is more likely that the voltage coupling will be used for control of voltage controlled actuators which are to be used at the control points of elastic coupling devices. If used in this way, the number of actuators to be controlled by each resistive coupling device would typically be substantial if the elastic coupling devices are used for direct mirror actuation, but might be quite small if the elastic coupling devices are required only to actuate control transducers. In either case, achieving good overall mirror control accuracy will require good accuracy in the initial voltage control phase. No attempt is made in FIGS. 12 through 14 to indicate the gradation of resistance required for each resistive coupling device.

FIG. 12 represents a system in which accurate voltage control is to be achieved using well designed resistive coupling devices, based on accurately computed coefficients, and employing very high quality components throughout. The voltages which are to be impressed onto the resistive coupling devices at the control points are formed by a primary control system comprising a digital computer 264, a transmission link 266 and a plurality of control unit and digital to analog converter combinations 268 which are each located in the vicinity of a control point for one of the resistive coupling devices 270. The computer 264, for purposes of this figure, should be programmed to generate highly accurate sun position data in the form of direction cosines for the sun, computed with respect to the coordinate axes of the coordinate system used for establishing the mirror pattern. The computer 264 further uses the direction cosine data to compute the appropriate values of the control function for each resistive coupling device control point in the mirror array. The control function value computed for each individual control point is sent in digital form over the transmission link 266 to the appropriate one of the plurality of control unit and digital to analog converter combinations 268, where it is converted to a voltage which is impressed upon the particular resistive coupling device 270 which contains that control point. The resistive coupling devices 270 should be constructed using good electrical shielding practice and containing resistive components having a low value of temperature coefficient of resistance. At the site of each voltage controlled actuator along a mirror containing path, the control voltage is tapped off the resistive coupling device 270 which serves that path by means of a local site connector 272. The voltage tapped from each particular site connector 272 is applied to one input of an associated differential amplifier 274. The other input of the differential amplifier 274 is connected to the wiper of a position sensing potentiometer 276 which is coupled to a voltage controlled actuator 278 at that site. The output of the differential amplifier 274, after amplification to an appropriate power level, is applied to the actuator 278, which moves the associated control linkage, and the potentiometer wiper coupled thereto, so as to keep the voltage appearing at the wiper of the position sensing potentiometer 276 in balance with the voltage tapped from the local site connector 272. The voltage impressed across the resistance element of the position sensing potentiometer 276 is supplied by a precision voltage source 280, which typically may service the potentiometers of a number of actuators. The constant electric potential of each terminal of the voltage source 280 must be properly correlated with the voltage range of the digital to analog converters 268, so that when a position sensing potentiometer 276 is in balance with the voltage established by the control system, the actuator 278 associated with the potentiometer 276 is in the desired configuration.

If the paths along which the resistive coupling devices 270 extend are the row and column paths of FIG. 1, and if the length of each path is substantially greater than the height of the radiation receiver, then regardless of the quality of components used in the resistive coupling device 270, it will generally be necessary to provide one or more secondary control points along each resistive coupling device 270 to keep the intrinsic errors of the coupling process within the desired limits. The secondary control points, which are not shown in FIG. 12, may each be serviced by an additional digital to analog converter 268 linked to the computer 264. However it would also be possible to use feedback from an electro-optical sensor which monitors the reflected beam from a mirror adjacent to a particular voltage controlled actuator to provide a secondary control point for the resistive coupling device.

FIG. 13 shows the means by which electro-optical sensors may be used as part of the primary control system, either to provide a secondary control point along a resistive coupling device or, if necessary, to upgrade the voltage provided at essential control points by an approximately programmed or rudimentary digital portion of the primary control system. In FIG. 13, it shall be assumed that the resistive coupling device 270a and all other components of the analog portion of the control system are well designed and employ precision components, but that the distance between essential control points is substantially greater than h in length and therefore the resistive coupling device 270a will require a secondary control point along its length. In addition, it shall be assumed that the digital portion of the control system is not capable of providing precise voltage values at the essential control points.

The means of using an electro-optical sensor to upgrade the voltage values furnished by the digital portion of the primary control system to the essential control points is shown on the right hand side of FIG. 13, where the voltage output from a digital to analog converter 268a is applied to one input of a two-input summing amplifier 282. The output of the summing amplifier 282 is impressed on the resistive coupling device 270a and is also applied to one input of the differential amplifier 274a which controls a particular voltage controlled actuator 278a which is mechanically closely coupled to the mirror, not shown, nearest the essential control point serviced by the digital to analog converter 268a. The second input to the summing amplifier 282 is from a voltage feedback circuit 284 which contains a pair of sensing elements 286 from an electro-optical sensor as shown in FIG. 11. The sensing elements 286 of the voltage feedback circuit 284 shall be assumed to be matched photoconductive cells, which are shunted by matched resistors 288 having resistance values substantially less than the dark resistance of the photoconductive cells 286. Voltages of opposite polarity are applied across each combination of photoconductive cell 286 and shunt resistor 288 by matched voltage sources 290, which may be chemical batteries, battery eliminators, matched solar cells, or any other source of low D.C. voltage. When the increment of the reflected beam from the monitored mirror which is intercepted and focused by the electro-optical sensor similar to FIG. 11 falls between the photoconductive cells 286, the voltage feedback circuit 284 produces a zero output. However, if the monitored reflected beam impinges on either photoconductive cell 286, the voltage feedback circuit 284 will produce a non-zero voltage which is applied to the second input of the summing amplifier 282. The polarity of the output from the voltage feedback circuit 284 is to be such that the non-zero output will act through the summing amplifier 282, the differential amplifier 274a, the position sensing potentiometer, not shown, and the actuator 278a, to correct the particular tilt angle component associated with the voltage feedback circuit 284.

To provide a secondary control point based on feedback from an electro-optical sensor at some intermediate point along a resistive coupling device, a different type of circuitry is required than that used at an essential control point. This is illustrated in the middle region of FIG. 13. In this case, the voltage tapped from the particular site connector 272a at the point where a secondary control point is to be established is applied to a voltage follower circuit 292 which provides an output at the same potential as the particular site connector 272a. The voltage tapped from the site connector 272a is also applied to the control of a particular actuator 278a which is closely coupled to a mirror in the vicinity of the particular site connector 272a. A current feedback circuit 294 comprised of matched photoconductive cells 286a and matched voltage sources 290a is connected to the output of the voltage follower circuit 292. The current feedback circuit 294 is incorporated into an electro-optical sensor of the type shown in FIG. 11, which is used to monitor the particular mirror which has one tilt angle component closely coupled to the actuator 278a, and the output of the current feedback circuit 294 is fed back to the local site connector 272a. If the intercepted portion of the reflected beam from the monitored mirror impinges on either photoconductive cell 286a, the polarity of the current feedback circuit 294 is to be such as to provide a current output of the proper sign to the particular site connector 272a to alter the local voltage on the resistive coupling device 270a in such a way as to correct the tilt angle component of the monitored mirror.

It has previously been pointed out that there is no general rule relating the values of components of a coupling device on opposite sides of a control point, and that each interval of coupling device between control points may be designed independently. These statements do not apply, however, to a resistive coupling device having a secondary control point established by the presence of an electro-optical sensor, as in FIG. 13. As a relatively accurate voltage value must initially be established by the resistive coupling device to bring the beam from a monitored mirror within range of the electro-optical sensor, the resistive coupling devices should be designed for the intervals between essential control points as though there were no secondary control points.

In FIG. 14 there is shown the means of applying voltage feedback from electro-optical sensors at each site connector 272b along a resistive coupling device 270b without altering the voltage on the coupling device 270b. This system is appropriate if the quality of either or both of the coupling device 270b and the position sensing potentiometers, not shown in this figure, are not adequate to provide accurate mirror control. In this case the voltages established on the resistive coupling device 270b will be used only for rough positioning of the actuators, not shown, while fine control of the actuators will be by voltage feedback circuits 284b, similar to those described with reference to FIG. 13, which are inserted between the resistive coupling device 270b and the individual site connectors 272b.

In addition to the ways in which electro-optical feedback devices are employed in FIGS. 13 and 14, there is another way of employing them which is not shown in the figures. In FIG. 12 it was assumed that the computer 264 generated accurate direction cosines for the sun's position at each instant and applied these direction cosines to the computation of the proper value of the control function at each control point. However, the accurate computation of the proper direction cosines may be a considerably more involved computation than the subsequent computation of the proper values of the control functions at the control points. In some cases it may therefore be advantageous to have the computer initially provide only approximate values of the sun's direction cosines, with outputs from a limited number of electro-optical feedback circuits fed back to the computer to correct the direction cosine data. The precise monitoring of the tilt angle component about one axis of resolution at two different points in the mirror array plus the monitoring of the complementary tilt angle component at one point in the mirror array is sufficient to determine the three direction cosines.

To compute the direction cosines, either approximately or exactly, it is desirable to express the cosines in terms of the latitude of the collector and the slope, if any, of the reference plane, and the declination and hour angle of the sun. While it has been assumed that the reference plane used for establishing the mirror pattern for a large scale collector would be horizontal, the reference plane for small scale collectors will generally have a substantial slope with respect to the horizontal. For simplicity, it will be assumed that any slope is about an axis in the east-west direction. As used here, these angles will be defined in the following way:

$\delta$ represents the declination of the sun, positive if north.

$\tau$ represents the hour angle, zero at solar noon and positive in the afternoon.

$\lambda$ represents the latitude of the collector, positive if north.

$\sigma$ represents the slope, if any, of the reference plane about an east-west axis, positive if southward.

For the particular case that the positive X axis of the coordinate system as shown in FIGS. 1 and 2 is directed southward, the sun's direction cosines with respect to the X, Y, and Z axes, which are $\sin \theta \cos \phi$, $\sin \phi \sin \phi$, and $\cos \theta$ respectively are:

$\sin \theta \cos \phi = -\sin \delta \cos(\lambda - \sigma) + \cos \delta \cos \tau \sin(\lambda - \sigma)$ $\sin \theta \sin \phi = -\cos \delta \sin \tau$ $\cos \theta = \sin \delta \sin(\lambda - \sigma) + \cos \delta \cos \tau \cos(\lambda - \sigma)$ Exact computation of the direction cosines will require the accurate representation of declination throughout the year, an accurate representation of local solar time as a function of standard time, and possibly a small correction for refraction by the earth's atmosphere. The computer should also be capable of generating alternative instructions if the mirrors need to be taken out of the focusing mode. For example, in very high winds the mirrors should all be brought to a horizontal position, and in case of a hailstorm the mirrors should be tipped at the maximum angle.

Figure 15:
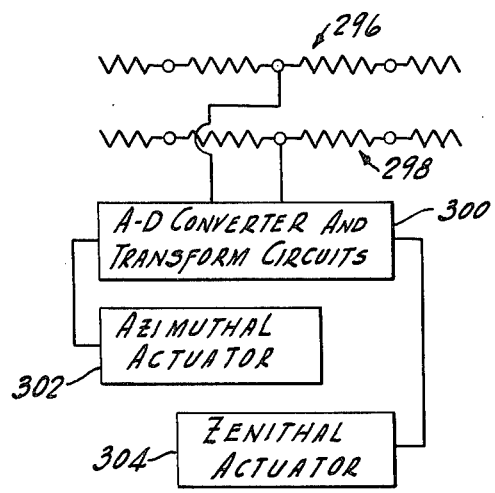
FIG. 15 is a schematic diagram illustrating the use of resistive coupling devices in combination with local transformation circuitry for controlling the actuators of a conventional mirror mount.
Figure 16:
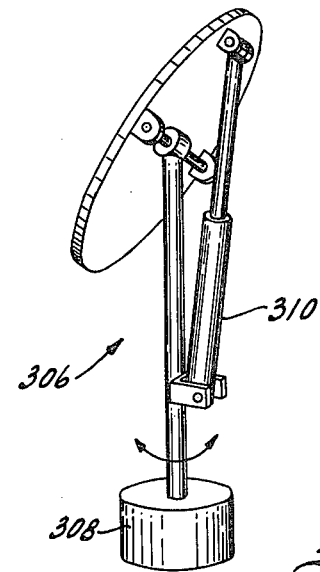
FIG. 16 illustrates a mirror mount potentially usable with the control system of FIG. 15.

Referring now to FIGS. 15 and 16, there is depicted a potential form of the invention in which voltages are used as the coupled analog quantities, and the coupled control voltages are used to control conventional types of mirror mounts, such as the azimuthal-zenithal mount, by employing appropriate transformation circuitry. As voltages proportional to $\tan \beta$ and $\tan \gamma$ may be coupled exactly using the circular mirror pattern of FIG. 2, and as the tangent functions of tilt angle components about fixed axes of resolution may readily be related to the tangent functions of angular components about the mirror mount axes of an azimuthal-zenithal mount, it would be tangent control functions and circular mirror patterns which would most aptly be used for this form of the invention. In FIG. 15, a voltage value from a first resistive coupling device 296 which couples a voltage proportional to the local value of $\tan \beta$, and from a second resistive coupling device 298 which coupled a voltage proportional to $\tan \gamma$, are provided to separate inputs of a local analog to digital converter and transform circuit combination 300. The tangent of the zenithal angle in the azimuthal-zenithal mount is equal to $(\tan^2\beta + \tan^2\gamma)^{\frac{1}{2}}$, while the tangent of the azimuthal angle is $(\tan\gamma/\tan\beta)$. After the coupled voltages proportional to $\tan \beta$ and $\tan \gamma$ have been converted to digital form, the digital information would be transformed, in combination, first to digital values of the tangents of the azimuthal and zenithal angles, and subsequently to information relevant to the specific type of azimuthal actuator 302 and zenithal actuator 304 used in the azimuthal-zenithal mirror mount. For example in FIG. 16 there is shown an azimuthal-zenithal mirror mount 306 having an azimuthal actuator 308, for which the relevant control parameter would be the azimuthal angle itself, and a zenithal actuator 310, for which the control parameter would be a function of the zenithal angle which is identical to the functional form developed with reference to FIG. 4A for a fixed axis of resolution. The utility of the resistive coupling devices in this system is that, by forming the detailed tilt angle component information in the form of local voltage values, they allow the mirror mount actuators to be controlled by low speed transformation circuitry which is identical for all parts of the mirror array, with no programmable feature required. To digitalize the voltages and transform the digital information to usable form for controlling mechanical actuators about axes other than the fixed orthogonal axes of resolution involves areas of technology which have been brought to a high state of development and for which the schematically illustrated instrumentation in FIG. 15 is well within the state of the art. However a comparison of the relative merits of this form of the invention with known systems in which digital control information is addressed directly to control units at each mirror site is beyond the scope of this work.

Referring now to FIGS. 17 through 25, there is shown a form of the invention adapted for small scale use. In this form of the invention the control functions are the tilt angle components $\beta$ and $\gamma$ themselves and the coupling devices are torsional elastic devices used for direct actuation of segmented mirrors in an orthogonal row and column mirror pattern. Mirror mounts using $\beta$ and $\gamma$ as control functions were not shown among the preferred forms for use in large scale applications because there tends to be mechanical interferences between the control linkages for these functions when used with one-piece mirrors mounted on pedestals. However by using torsional elastic coupling devices both to couple the proper tilt angle components to individual segmented mirrors, and to serve as structural members in a collective torsional mesh mounting structure for the mirrors, the interferences are avoided in a natural way. Small scale mirror arrays using these torsional coupling devices may most aptly be used in collectors in which the mirrors are protected by a transparent protective covering, as the effective stiffness against wind forces for the torsional coupling devices will typically be much lower than the effective stiffness characteristic of tensile elastic coupling devices of the type previously described. The collective mounting structure places the center of gravity of each segmented mirror at the center of rotation of its particular mirror mount so, with the mirrors protected from the wind, the only extraneous forces acting on the coupling devices will be a relatively small amount of friction at the individual mounts. For mirror arrays not greater than 2h×2h in size, it would therefore by expected that accurate coupling could be made using relatively lightweight coupling devices, with primary control applied only at essential control points.

The torsionally coupled mirror array requires a substantially more complicated control system than does the small scale rigid linkage system described in U.S. Pat. No. 4,102,326. However, there are certain applications for which the torsionally coupled mirror array would be uniquely suited. These applications would generally be those for which it is desirable to switch the small mirrors between the focusing mode and other orientations either to switch the collector to flat plate use on overcast days or to allow the transparent protective covering to have other architectural functions in addition to protecting the mirrors. For example, it would be possible to employ a curtain of small mirrors to turn a vertical face of a building having glass exterior walls into a central receiver collector, with the segments of the array contained in individual rooms being coupled by torsional members extending through bushings in the interior walls. The curtain of mirrors could alternatively be switched from the focusing mode to a fully open, a fully closed, or other programmed positions as warranted.

In the figures of the drawing which are to depict a small scale torsionally coupled mirror array, there shall be several specifically illustrated or assumed features which are not technically inherent to the invention, and which tend to degrade the potential accuracy of the torsionally coupled mirror array relative to the potentially low intrinsic errors associated with the functions $\beta$ and $\gamma$, but which may be significant in achieving economic viability for the torsionally linked system. The first of these features, which shall be assumed, is that the gradation of torsional compliance shall be nominally the same for all rows and columns, rather than specific for each row and column as could potentially be used for minimum intrinsic error. For designing the uniform coupling devices, one might choose to use coefficients obtained by averaging the values for equivalent positions on the individual rows and columns, computed using the empirical method for the functions $\beta$ and $\gamma$, or by using coefficients generated by evaluation of the expression $(1-\cos \pi 1_m 2L)$. For uniform mirror spacing of 0.1L in an orthogonal row and column mirror array in which the distance between essential control points is equal to the perpendicular distance from the mirror array to the radiation receiver, the averaged coefficients, starting from the control point on an axis of symmetry, are:

0 −.013 −.053 −.117 −.202 −.307 −.427 −.559 −.701 −.848 −1.0

For other mirror spacings, the coefficients could be found by plotting those given above as a function of position, drawing a smooth curve through the plotted points, and picking off the values of coefficients for the desired mirror spacing. For the same mirror spacing as above, coefficients obtained by evaluating the expression $(1-\cos \pi 1_m/2L)$ would be:

0 −.012 −.049 −.110 −.191 −.293 −.412 −.546 −.691 −.844 −1.0

The latter set of coefficients are heavily weighted in favor of individual rows and columns which are at the greatest distance from the particular axis of symmetry to which they are parallel. While coupling devices designed using coefficients obtained by averaging the values from the empirical method will yield somewhat lower intrinsic errors for the tilt angle components, it is not clear which set of coefficients would yield the lowest overall deviation of the reflected beams relative to the aiming point, as coefficients from the expression $(1-\cos \pi 1_m/2L)$ would tend to give better accuracy for the mirrors at the greatest distance from the radiation receiver, where a given alignment error produces the greatest final deviation of the reflected beam.

A second feature which reduces the achievable accuracy below that which is associated with the control functions in an ideal row and column mirror pattern is that the torsional mesh, as shown in the figures, will be allowed to sag slightly in one direction in order that no special structures be required to keep a non-vertical mirror array in a plane. As the appropriate axes of resolution for the mirrors in the sagging array are the local directions of the torsional coupling devices, and are not identical for all parts of the array; nor are the tilt angle components symmetrical in the direction of sag; computations beyond those previously described were required to ascertain that acceptable aiming accuracy could still be obtained. Using first order correction terms, which will be given later, to account for the sag, the intrinsic errors were computed for a $2h \times 2h$ array for which the torsional mesh was assumed to sag into the shape of a parabolic cylinder with the ends of the mirror columns having an upward slope of 0.1 with respect to the reference plane, and with the sagging mesh tangent to the reference plane along the Y axis. For a sagging array having rows and columns with identical compliance gradation determined using the same averaged coefficients applicable to torsional coupling devices intended for a plane array, and with the array as a whole tilted to an angle equal to the latitude of the collector, the averaged intrinsic error was found to remain under two milliradians for all hours within five hours of solar noon for all seasons of the year. For the small amount of sag considered, the assumed parabolic shape would be extremely close to the catenary configuration which would be the true shape if the torsional mesh was considered completely flexible and of uniform density. If the coupling devices have sufficient rigidity to be considered as bending beams rather than as completely flexible members, the parabolic approximation would be somewhat less valid. However there is no reason to expect that the intrinsic errors would be substantially further increased so long as the true shape, which may be established experimentally, is taken into account in programming the primary control system.

A third feature, explicitly depicted, which is intended to reduce the cost of this form of the invention, in exchange for some sacrifice in accuracy, is that the majority of control point tilt angle components will themselves be established by a type of elastic linkage, employing bending beams, with only a relatively small fraction of the control points being under the specific control of the primary control system computer. The basis for asserting that this type of interpolative control is capable of establishing accurate tilt angle component values at all control points is the observation that graphical plots of control point tilt angle component values for a $2h \times 2h$ mirror array could be fitted very accurately over the entire length of the curves by bending a piece of uniform spring wire so that it was forced to fit each curve at five generally equally spaced points, including the end points. To use this observation to create an interpolative control system for the control points of the torsionally coupled mirror array requires that the stiffness of the bending members be large compared to the torsional stiffness of the coupling devices. The bending members are therefore used in pairs so that the substantial required bending forces do not act on the principal frame members which carry the mirror array.

Figure 17:
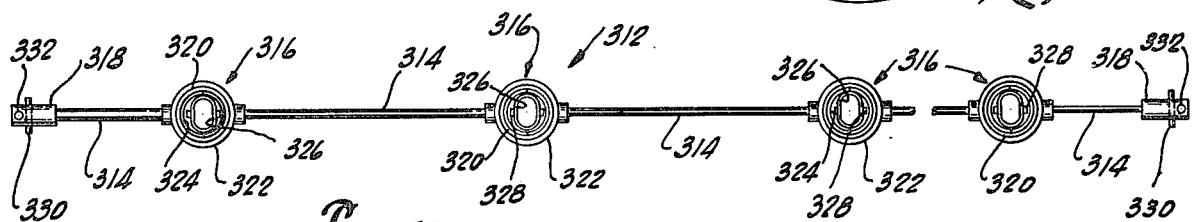
FIG. 17 is a side view illustrating a first type of torsional elastic coupling device of graded compliance, for use in the form of the invention preferred for small scale applications.

Referring specifically to FIG. 17, there is shown a first type of torsional elastic coupling device 312 which is comprised of a plurality of individual torsional segments 314 of cylindrical rod or tubing, with an individual mirror mount hub 316 employed as a connecting link between each pair of adjacent torsional segments 314, and with cylindrical end connectors 318 placed at the ends of the terminal segments 314 of the torsional coupling device 312. Each mirror mount hub 316 is comprised of: a ring bearing 320, an outer retaining ring 322 which fits around the outer race of the ring bearing 320 and is joined to the torsional segments 314 on each side of the mirror mount hub 316, an inner retaining ring 324 (to be shown in enlarged form in FIG. 21) which fits inside the inner race of the ring bearing 320 and which carries a primary pivoted ring 326 which provides pivotal motion about an axis which is orthogonal to the axis of the ring bearing 320 and which rotates with the inner race of the ring bearing. The primary pivoted ring 326 further carries a pair of secondary pivot engagement structures 328 which are aligned along an axis which is orthogonal to the axis of the primary pivoted ring 326. The inner retaining ring 324 also carries the attachment means, not shown in this figure, for connecting the segmented mirror to the mirror mount hub 316. The individual torsional segments 314 are of graded compliance according to the difference between coefficients for the set of coefficients used to design the coupling device 312. The cylindrical end connectors 318 each carry an alignment pin 330 and each contain a hole 332 sufficiently large for a sturdy retaining pin to be inserted.

Figure 18:
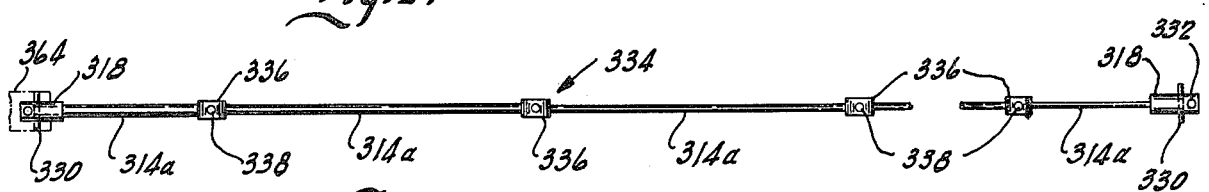
FIG. 18 is a side view illustrating a second type of torsional elastic coupling device, adapted to complement, and mesh with, the first type of torsional elastic coupling device shown in FIG. 17.

FIG. 18 shows a second type of torsional elastic coupling device 334 which is complementary to, and meshes with, the first type of torsional coupling device 312. The torsional elastic coupling device of the second type 334 is comprised of a plurality of individual torsional segments 314a of cylindrical rod or tube graded in compliance in generally identical fashion to the first type of torsional coupling device 312, with an individual segment connector 336 placed between each pair of adjacent torsional segments 314a, and with cylindrical end connectors 318 placed at the ends of the terminal segments 314a of the second type of torsional coupling device 334. The segment connectors 336 are shown with the configuration of solid cylinders with the torsional segments 314a connected diametrically across the cylindrical body of the connectors 336. Projecting diametrically from opposite sides of each segment connector 336 along a diameter which is orthogonal to the axis of the torsional segments 314a is a pair of spring loaded secondary pivot pins 338 which are to mesh with the secondary pivot engagement structures 328 on the primary pivoted ring 326 of a first type of torsional coupling device 312.

Figure 19:
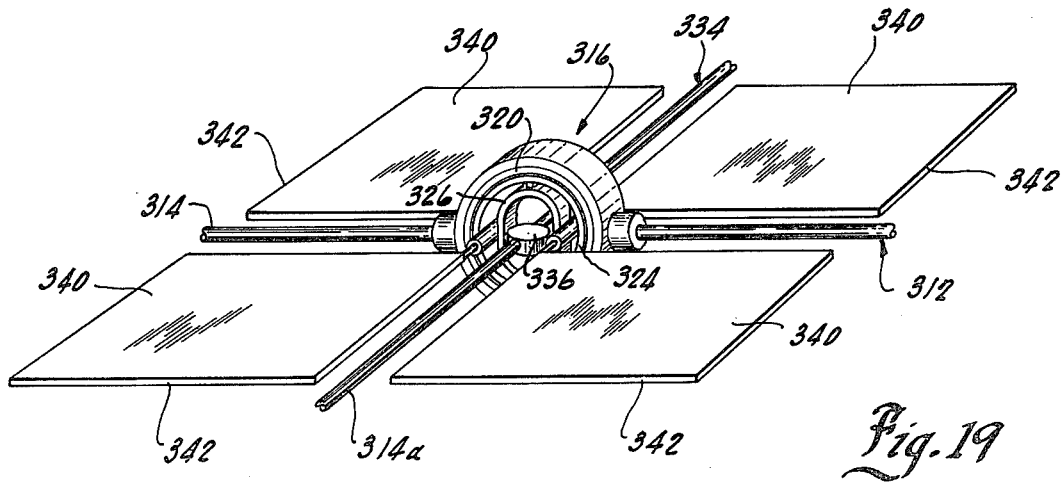
FIG. 19 illustrates a segmented mirror, appropriate for use with a torsional coupling system, mounted at a mesh point between a torsional elastic coupling device of the first type and a torsional elastic coupling device of the second type.

FIG. 19 shows a segmented mirror 340 mounted on a mirror mount hub 316 at the intersection of a torsional coupling device of the first type 312 and a torsional coupling device of the second type 334. The mirror 340 has four individual segments, preferably comprised of metallized plastic film stretched over individual mirror segment frames 342 which are fixed to the inner retaining ring 324 of the mirror mount hub 316. In order to avoid interference between the mirror 340 and the individual torsional segments 314 of the torsional coupling device of the first type 312, it is necessary only that the gap between segments of the mirrors 340 which must pass by the torsional segments 314 should be wider than the diameter of the torsional segments 314. However there is nothing fundamental about the motion of the mirror 340 which guarantees that there will not be interference with the individual torsional segments 314a of the torsional coupling device of the second type 334. When the mirrors 340 are in the focusing mode and the sun is tracked only at reasonable elevations, the maximum tilt angle component required for any mirror in a 2h×2h mirror field with centered radiation receiver will be roughly 60°. In this case there will be no interference between the mirror 340 and the torsional segments 314a if the gaps in the segmented mirror 340 which must pass by the torsional segments 314a are at least twice the combined dimension of the diameter of a torsional segment 314a plus the thickness of a mirror segment frame 342. However if the mirrors 340 are to be taken out of the focusing mode and tipped at large angles by rotation of the torsional coupling devices of the second type 334, there should be a safety instruction in the control system which insures that the mirrors 340 are only tipped at these large angles when the torsional coupling devices of the first type 312 are oriented so that the axis of the ring bearing 320 is parallel to the direction of the torsional coupling device of the second type 334 at all mirror mounts.

Figure 20:
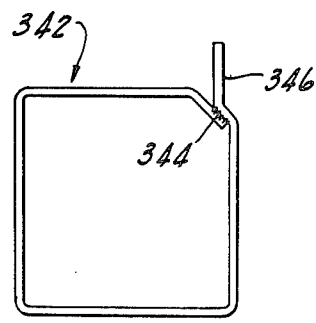
FIG. 20 is a plan view showing a frame for an individual segment of the segmented mirror shown in FIG. 19.

FIG. 20 shows a mirror segment frame 342, which will typically be formed of relatively hard wire bent to a generally square shape. At one corner of the mirror segment frame 342 the ends of the wire are bent diagonally with respect to the sides of the frame 342, with the end regions joined in a weld 344 along this diagonal section and a short length of one end being further bent away from the diagonal to form a mounting projection 346 which is used to mount the mirror segment frame 342 to the mirror mount hub 316. By properly placing the projection 346 along the diagonal corner section of the segment frame 342, the individual segment frames 342 may be formed to produce the minimum gap required to avoid interference with the torsional coupling devices 312 and 334. Metallized plastic film may be attached to the segment frames 342 by adhesive bonding or other convenient means.

Figure 21:
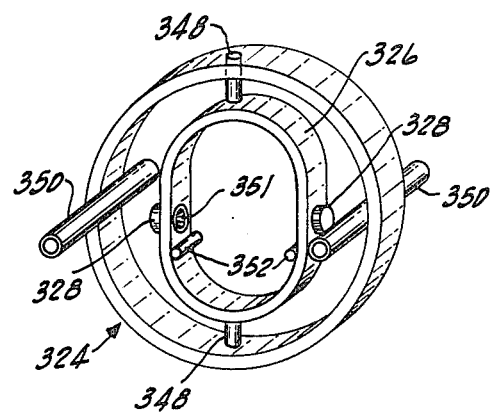
FIG. 21 is an enlarged perspective view illustrating an inner retaining ring and associated pivot components and mirror segment holding components used in the first type of torsional coupling device.

FIG. 21 shows a structure for the inner retaining ring 324 which is to be fitted into the inner race of the ring bearing 320 in the torsional coupling device of the first type 312. The inner retaining ring 324 is engaged at opposite points along a diameter by pivots 348 which are fixed to the primary pivoted ring 326. On the inner surface of the retaining ring 324, at opposite points on a diameter which is orthogonal to the axis of the pivots 348, are welded two segment frame mounting tubes 350 which project on each side of the inner retaining ring 324. To mount the individual segments of each segmented mirror 340 on the assembled mirror mount hub 316, the mounting projections 346 from the individual mirror segments are inserted into the mounting tubes 350, after which the mounting tubes 350 are crimped to hold the individual mirror segments in place. In FIG. 21 the secondary pivot engagement structures 328 are shown to be each associated with a tapered opening 351 in the wall of the primary pivoted ring 326. The inner surface of the primary pivoted ring 326 is also shown to carry narrow projecting ridge structures 352. The tapered openings 351 and the projecting ridges 352 are useful in carrying out a particular procedure, to be described with reference to FIG. 22, for forming the mesh between the torsional coupling devices of the first type 312 and of the second type 334.

Figure 22:
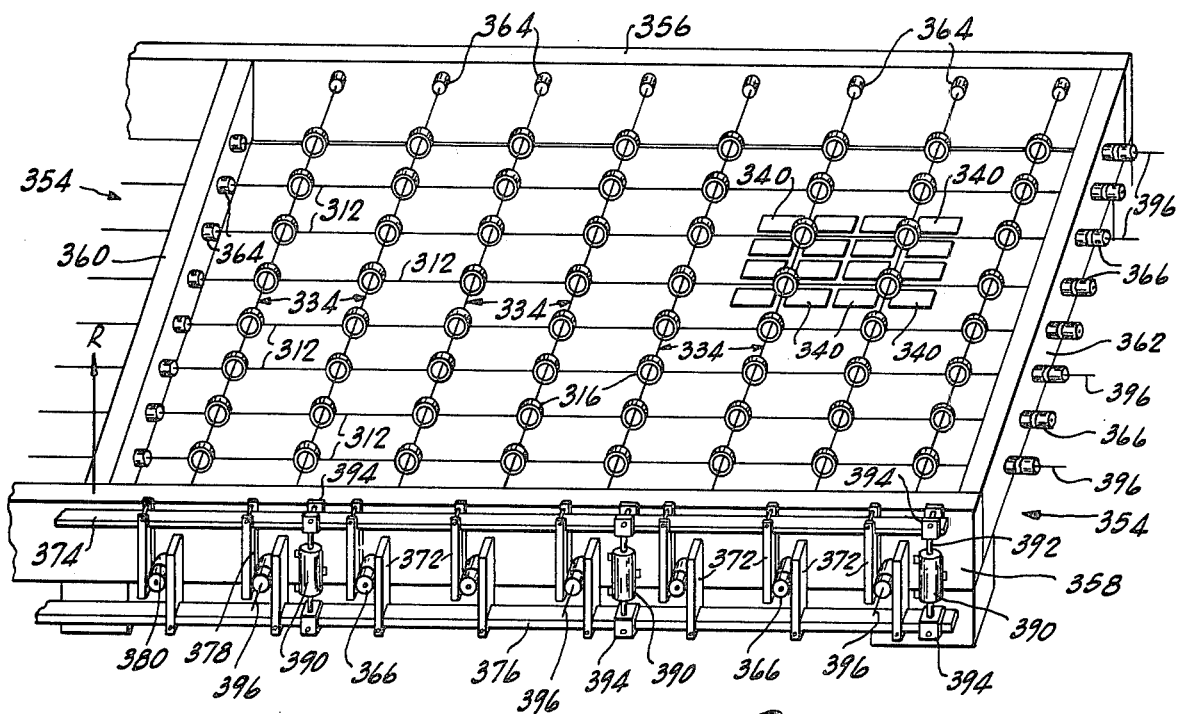
FIG. 22 is a perspective view showing one quadrant of a two quadrant torsionally coupled mirror array mounted in an appropriate frame. The radiation receiver is not shown and only a small increment of the segmented mirrors are shown. A bending beam apparatus for establishing the rotational orientations of the ends of the coupling devices is shown.
Figure 23:
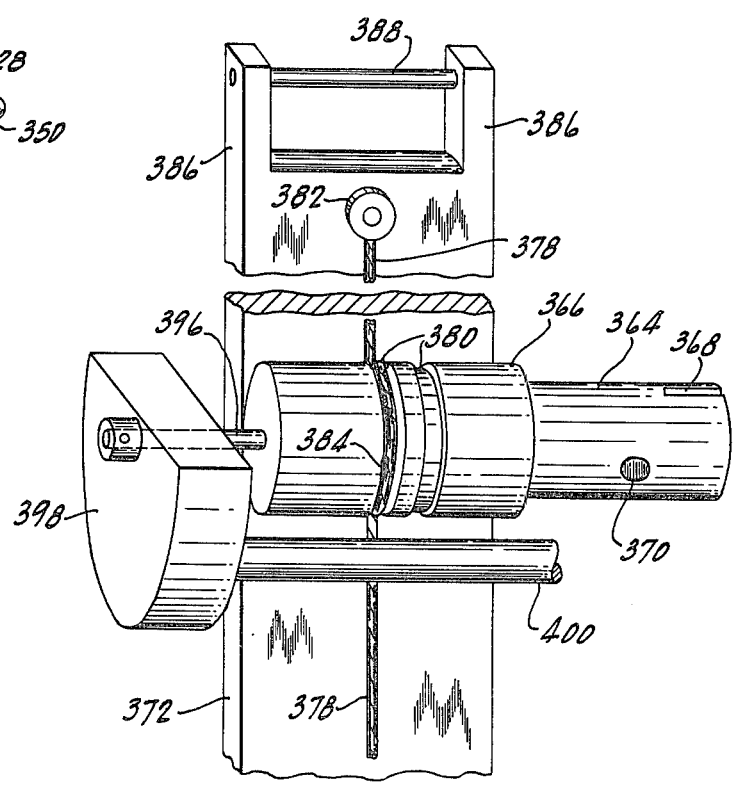
FIG. 23 is an enlarged detail view illustrating a capstan drive used at the ends of the torsional coupling devices in FIG. 22, and a push rod linkage which couples the capstan drive to a bending beam member as shown in FIG. 22. A half turn potentiometer appropriate for use for monitoring the angular orientation at the end of one of a selected plurality of torsional coupling devices is also shown.

A particular means of supporting and driving the torsionally coupled mirror array is shown by the combination of FIGS. 22 and 23. FIG. 22 shows one quadrant of a two quadrant mirror array using a sagging torsional mesh for coupling the proper values of the tilt angle components along the individual mirror containing paths and a bending beam apparatus for interpolative control of the majority of control points. Because of the tilted construction which is preferred for the small scale collectors, it will in many cases be desirable to construct mirror arrays which have substantially greater length than width. This is facilitated by placing mirrors in only two quadrants of the coordinate system used for establishing the mirror pattern, as shown in FIG. 22.

The quadrant of the mirror array shown in FIG. 22 is supported by a frame 354 comprised of a back frame member 356, a front frame member 358, a center frame member 360, and a side frame member 362. The back frame member 356 and the front frame member 358 serve as frame members for both quadrants of the mirror array, with the center frame member 360 serving as the boundary between the quadrant which is shown and a second quadrant. A plurality of torsional coupling devices of the second type 334 extend from the back frame member 356 to the front frame member 358. In order to avoid the need for additional support throughout the mirror array in the particular embodiment shown in FIG. 22, the torsional coupling devices of the second type 334 are allowed to sag so that they can carry the weight of the mirror array. The sagging torsional coupling devices of the second type 334 are tangent, along the front frame member 358, to the reference plane, not shown, which was used for establishing the mirror pattern. The origin of the coordinate system, not shown, is at the intersection of the center frame member 360 with the front frame member 358, and the position of the radiation receiver, not shown, is indicated by an arrow emanating from that location. The back frame member 356 should preferably be tilted relative to the front frame member 358 in such a manner that the sagging torsional coupling devices of the second type 334 engage both frame members at normal incidence. A plurality of torsional coupling devices of the first type 312, carrying segmented mirrors 340, of which only a few are shown, extend between the center frame member 360 and the side frame member 362. Each torsional coupling device of the first type 312, is engaged and supported by a number of sagging torsional coupling devices of the second type 334. The locus of points at which the plurality of coupling devices of the first type 312 engage the center frame member 360 and the side frame member 362 must lie along curves which correspond to the shape of each sagging torsional coupling device of the second type 334. In the particular embodiment shown in FIG. 22, the cylindrical end connectors 318 of the torsional coupling devices of FIGS. 17 and 18 are engaged by cylindrical projections 364 which project into the frame 354 from capstan drive cylinders 366. The cylindrical projections 364 pass through, and are supported by, bearings, not shown, in the frame 354. To engage the end connectors 318, the cylindrical projections 364 have a tubular end section, which is shown in FIG. 23 to have an alignment slot 368, into which the alignment pin 330 of an end connector 318 of FIGS. 17 and 18 is fitted, and a hole 370 into which a sturdy retaining pin, not shown, is inserted to hold the end connector 318.

Each capstan drive cylinder 366 is engaged by a pair of push rods 372 which are positioned on opposite sides of the individual drive cylinder 366. The push rods 372 and associated driving means are shown only along the front frame member 358, but would be present along each of the frame members. The push rod 372 on one side of each drive cylinder 366 along a particular frame member is coupled to an upper bendable beam 374. The push rod 372 on the opposite side of each drive cylinder 366 along the frame member is coupled to a lower bendable beam 376. Each push rod 372 carries a length of flexible cable 378 which is wrapped once around the associated drive cylinder 366 in one of a pair of grooves 380 of depth equal to the thickness of the cable 378. Each end of the cable 378 is firmly fixed to the push rod 372 which carries it by sturdy connectors 382, of which one is shown in the partial view shown in FIG. 23. The cable 378 carried by each push rod 372 is positively connected to the associated drive cylinder 366 by a weld 384 or other convenient means. The connections of the cables 378 to the drive cylinders 366 are made at equivalent positions for all push rods 372, so that each pair of push rods 372 may be symmetrically positioned with respect to the associated drive cylinder 366, and the relationship between the angular orientation of a drive cylinder 366 and the linear positions of the associated push rods 372 is identical for all push rod and drive cylinder combinations. Each push rod 372 carries a pair of separated extensions 386, between which the bendable beam 374 or 376 engaged by that push rod is fitted. The engagement between each push rod 372 and bendable beam 374 or 376 is completed by inserting a beam retaining pin 388 into a pair of aligned holes in the extensions 386. There may be alignment guides, not shown, on the upper and lower beams 374 and 276 to hold the push rods 372 at the proper engagement points, but the engagement should not be so firm as to preclude a slight angular motion of the push rods 372 with respect to the bendable beams.

The spacing between the upper bendable beam 374 and the lower bendable beam 376 is established by a plurality of hydraulic actuators 390, each of which is fixed to the frame 354 very near to one of a selected group of drive cylinders 366 by appropriate connection means, not shown. Each hydraulic actuator 390 has separate pistons and piston rods 392 at each end, with the piston rods 392 engaging the bendable beams 374 and 376 by means of beam holding brackets 394. The engagement of the piston rods 392 to the bendable beams 374 and 376 should also allow for a slight angular movement between these components. Because the positions of the bendable beams 374 and 376 are essentially forced to be symmetric about the positions of the drive cylinders 366 by the positive connections of the cables 378 to the drive cylinders 366, the separate ends of the hydraulic actuators 390 do not require separate controls, but they must be symmetric. In order to control the hydraulic actuators 390, a potentiometer connection shaft 396 is extended from each of the selected drive cylinders 366 which are located very near a hydraulic actuator 390, and a half-turn potentiometer 398, shown only in FIG. 23, is connected to the shaft 396 to serve as a feedback means. Each half-turn potentiometer 398 is fixed to the frame 354 by a connection rod 400.

Along the center frame member 360 and the side frame member 362, where the drive cylinders 366 lie along curves which correspond to the shape of the sagging mirror array, the hydraulic actuators 390 should be aligned perpendicular to the curves. The upper and lower bendable beams used along these frame members should also preferably be preformed to the shape of the sagging mirror array, to avoid unnecessary forces acting on the frame members. The half-turn feedback potentiometers 398 should also be aligned relative to the curve defining the shape of the mirror array.

It shall be assumed that the first and second types of coupling devices 312 and 334 are to be pre-assembled, but that the mesh between the two types of coupling devices must be formed at the collector installation site. As an aid to the formation of the mesh, it is suggested that the secondary pivot pins 338 carried by the segment connectors 336 of the second type of torsional coupling device 334 be spring loaded pins initially contained within the body of the segment connectors 336. The pivot pins 338 may be initially retained in their retracted position by a low melting point wax or other convenient means. Once released from their retracted position and fully extended, the spring loading mechanism for the pins 338 should be overridden by a latching mechanism within the body of the segment connectors 336 so that the pins will remain in the extended position. It shall be assumed that the combination of spring loading and latching mechanisms are within the scope of the art, and no specific structure will be shown. To form the mesh between the complementary coupling devices, it is suggested that the torsional coupling devices of the first type 312 be installed first, starting either from the front or back and working in one direction. During installation, the coupling devices of the first type 312 should preferably be held in place by temporary supports, not shown, suitably engaged to the frame 354. As each successive coupling device of the first type 312 is installed, one of a plurality of temporary flexible guide strips, not shown, would be pulled through the primary pivoted ring 326 on all mirror mount hubs 316 at a corresponding position on the installed torsional coupling devices of the first type 312, with each temporary guide strip resting on the projecting ridge structures 352 on the primary pivoted rings 326 through which the guide strip passes. The drive cylinders 366 would initially not be put in place in the front and back frame members, and the flexible guide strips would be pulled through the available openings. After all of the first type of torsional coupling devices 312 are installed, the torsional coupling devices of the second type 334 are each to be pulled along the temporary guide strips through the primary pivoted rings 326 on all mirror mount hubs 316 at a corresponding position on the torsional coupling devices of the first type 312. The ridge structures 352 in the primary pivoted rings 326 are to be so positioned that the initially retracted spring loaded pivot pins 338 contained in the body of the segment connectors 336 would be accurately aligned with the tapered openings 351 associated with the secondary pivot engagement structures 328. If the pivot pins 338 are initially retained in their retracted position by low melting point wax, the temporary guide strips would carry resistive heating elements appropriately positioned to apply heat to the segment connectors 336 once the coupling devices are in place. After the pivot pins 338 have been extended to each engage a secondary pivot engagement structure 328, the temporary guide strips would be removed, the end connections made for the torsional coupling devices of the second type 334, and the temporary supports for the torsional coupling devices of the first type 312 removed.

Figure 24:
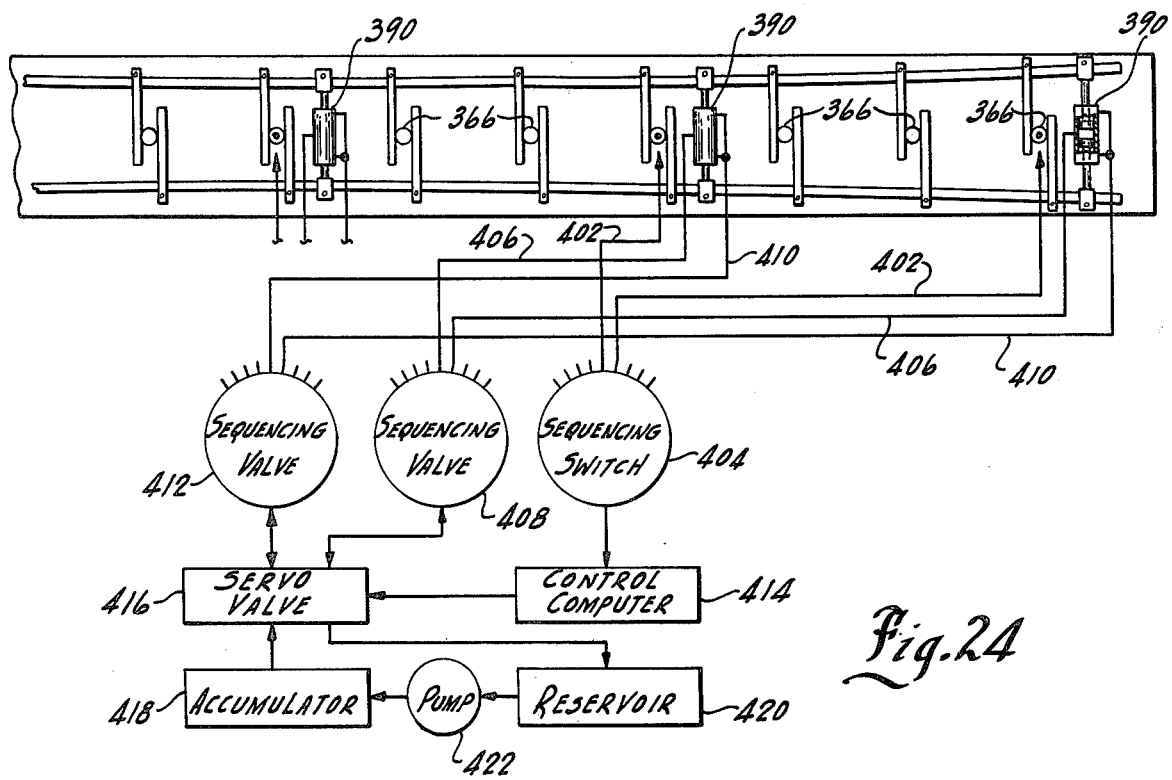
FIG. 24 is a diagrammatic side view of the bending beam apparatus used for interpolative control of the capstan drive members used at the ends of the torsional coupling devices as shown in FIG. 22, with a schematic diagram illustrating the control system for hydraulic actuators used to control the spacing of the bending beams.

FIG. 24 diagrammatically shows a control system for the hydraulic actuators 390. In the system shown in FIG. 24, each feedback potentiometer, not shown in this figure, which monitors the angular position of a drive cylinder 366 near a hydraulic actuator 390, is connected by means of one of a plurality of individual electrical leads 402 to one terminal of a sequencing switch 404 which allows the position of each monitored drive cylinder 366 to be sequentially sampled. Similarly, the center port on each hydraulic actuator 390 is connected by one of a first plurality of small diameter hydraulic lines 406 to one port of a first multiport sequencing valve 408, and the end ports of each hydraulic actuator 390 are connected by one of a second plurality of small diameter hydraulic lines 410 to one port of a second multiport sequencing valve 412. The sequencing switch 404 and the pair of sequencing valves 408 and 412 are driven in synchronism by appropriate means, not shown. A control computer 414 generates sun position data and computes the appropriate angular orientations for the drive cylinders 366 at the selected control point positions which are associated with nearby hydraulic actuators 390. The computed angular position data is converted to voltage values which are presented, in synchronism with the sequencing switch 404, for comparison with the sampled values from the feedback potentiometers. The error signal is amplified to an appropriate power level to actuate a four way servo-valve 416, which controls the flow between the common ports of the sequencing valves 408 and 412 and a high pressure accumulator 418 and a low pressure reservoir 420. A hydraulic pump 422 periodically replenishes the accumulator 418. Errors due specifically to the periodic nature of the sampling and correction process would be minimized if the computer 414 were programmed to establish the drive cylinder angular orientations to correspond to a time in advance of the true time by one half of the period required to complete a sequencing cycle. A sequencing cycle time of one minute would in this case introduce a maximum error attributable directly to the periodic nature of the correction process of about one milliradian.

If the torsionally coupled mirror array is allowed to sag in one direction to eliminate the need for external support, as shown in FIG. 22, this sag must be taken into account in programming the control computer 414 to compute the appropriate tilt angle components for the selected control points. With the sagging torsional members aligned in the X direction and made tangent to the reference plane along the Y axis, the sag would be described as an elevation of the mirror array above the reference plane by an amount $z(x)$, where $z(0)$ is zero. If the X axis is directed southward on a reference plane which has a slope designated by $\sigma$, the first order effect of the sag on the direction cosines of the sun's position relative to a reference system which is locally tangent to the sagging array would be to replace $\sigma$ by $\sigma' = \sigma - dz/dx$ in the equations given earlier for the direction cosines of the sun's position. In the equations for $\tan \beta$ and $\tan \gamma$, given the appropriate local direction cosines for the sun, the first order changes in the parameters used in the equations would be as follows:

$$x' = x - h\,dz/dx$$

$$y' = y$$

$$h' = h - z + x\,dz/dx$$

$$S' = (x^2 + y^2 + h^2 - 2hz)^{\frac{1}{2}}$$

The true shape of the sagging members may be determined experimentally, but in most cases would probably be adequately represented by a parabolic approximation.

Figure 25:
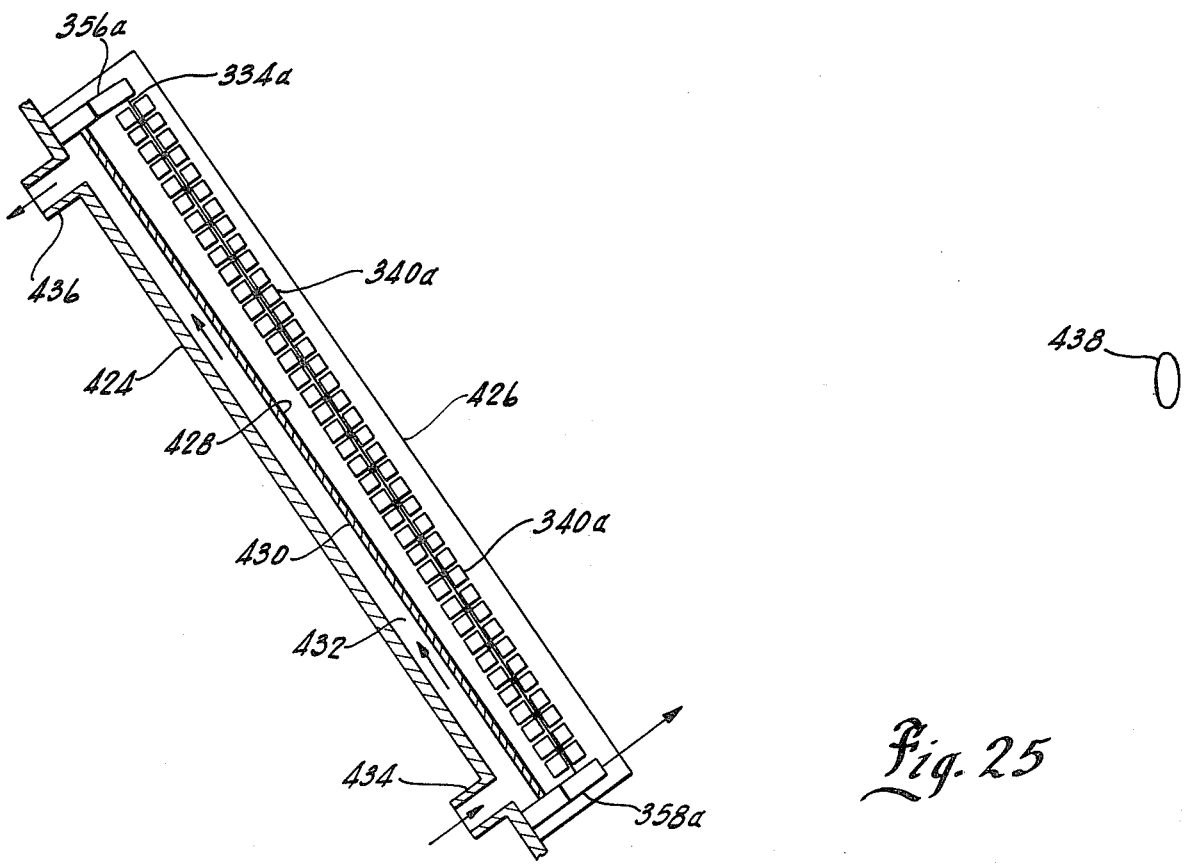
FIG. 25 is a diagrammatic side view illustrating a form of the invention using torsionally coupled mirrors which is adapted to being converted to flat plate use on overcast days.

Referring now to FIG. 25, there is diagrammatically shown a form of the invention using a torsionally coupled mirror array which allows the collector to be switched to flat plate use on overcast days. FIG. 25 shows a mirror array comprised of a plurality of segmented mirrors 340a which are suspended along one of a plurality of sagging torsional coupling devices 334a between a back frame member 356a and a front frame member 358a. The frame members, including side frame members, not shown, are supported by a rigid bottom wall 424. The mirror array is protected by a transparent protective covering 426. The segmented mirrors 340a are shown in a nonfocusing mode in which the plane of each mirror 340a is perpendicular to the surface of the mirror array. The mirrors 340a are made reflective on both their front and back surfaces, so that when placed in the position shown in FIG. 25, the great majority of diffuse radiation which enters the transparent covering 426 will pass by the mirrors 340a either directly or after one or more reflections. Below the mirrors 340a there is a broad area absorbing surface 428 comprised of an appropriate coating on a thin metal wall 430 which is spaced from the rigid bottom wall 424. To transport heat absorbed at the broad area absorbing surface 428 to a use region, air is forced through a duct 432 formed between the thin metal wall 430 and the rigid bottom wall 424 by a fan, not shown. The air flow is from an entrance port 434 to an exit port 436.

In the presence of a focusable beam component of solar radiation, the mirrors 340a would be placed in the focusing mode in which the reflected beam from each mirror 340a is directed toward the small scale radiation receiver 438, which is supported by an appropriate structure, not shown.

Various modes of carrying out the invention are contemplated as being within the scope of the following claims particularly pointing out and distinctly claiming the subject matter which is regarded as the invention.

I claim:

1. In a solar radiation collector having a central radiation receiver, a multimirror concentrator of solar radiation, comprising:
   (a) a plurality of mirrors in a mirror array,
   (b) a plurality of articulated mirror mounts, each adapted to carry a mirror and to allow angular motion of the mirror about a fixed center of rotation by independent angular rotations about two orthogonal mirror mount axes, the mirror array having a plurality of individual mirror positions, defined by the positions of the fixed centers of rotation of the individual mirrors, which are disposed over a surface in specified mirror containing paths, each mirror position of the mirror array having associated therewith a first fixed axis of resolution and a second fixed axis of resolution which is orthogonal to the first fixed axis of resolution, the directions of the first fixed axis of resolution for all mirror positions and of the second fixed axis of resolution for all mirror positions being respectively essentially parallel,
   (c) primary control means for establishing, at each of a first plurality of control point positions in the mirror array, a value for a variable analog control quantity proportional to the value at the respective control point positions of a first control function and, at each of a second plurality of control point positions in the mirror array, a value for the variable analog control quantity proportional to the value at the respective control point positions of a second control function; the first control function being a smoothly varying monotonic function of a first tilt angle component, $\beta$, resolved about the first fixed axis of resolution for each mirror position and the second control function being a smoothly varying monotonic function of a second tilt angle component, $\gamma$, resolved about the second fixed axis of resolution for each mirror position; each specified mirror containing path having at least two control point positions of at least one of the pluralities of control point positions spaced by intermediate mirror positions, and all mirror positions in the mirror array being located on one specified mirror containing path having at least two of the spaced control point positions of the first plurality of control point positions and on one specified mirror containing path having at least two of the spaced control point positions of the second plurality of control point positions,
   (d) extended coupling means, comprised of individual linear series systems having preselected gradations of component values, for coupling fixed linear combinations of the values of the analog control quantity established by the primary control means at the spaced control point positions of the first and second pluralities of control point positions on the specified mirror containing paths to all mirror positions intermediately included between the spaced control point positions of the first plurality and of the second plurality, respectively, of control point positions; with the gradation of component values for the individual linear series systems being so selected that the establishment by the primary control means of values of the analog control quantity which proportionally represent, at the first and second pluralities of control point positions, the appropriate values of the first and second control functions respectively for mirrors oriented to reflect solar radiation onto the radiation receiver results in the establishment by the extended coupling means of values of the analog control quantity which proportionally represent, with low intrinsic error, the values of the first and second control functions for mirrors oriented to reflect solar radiation onto the radiation receiver at mirror positions intermediately included between spaced control point positions of the first and of the second pluralities of control point positions, respectively, along the specified mirror containing paths, and
   (e) means for establishing angular orientations about the orthogonal mirror mount axes for each mirror which correspond to the combination of values of the analog control quantity which represent the values of the first and second control functions at the individual mirror positions.

2. The radiation concentrator of claim 1, wherein the mirror array has associated therewith a reference plane containing a first axis and a second axis of a pair of mutually orthogonal axes of symmetry, the first axis of symmetry being essentially parallel to the direction of the second axis of resolution for all mirror positions in the mirror array and the second axis of symmetry being essentially parallel to the direction of the first axis of resolution for all mirror positions in the mirror array; the first and second axes of symmetry intersecting at the point where a straight line passing through the radiation receiver intersects the reference plane perpendicularly; the specified mirror containing paths in the mirror array being those paths for which straight lines projecting from the radiation receiver through the individual mirror positions on a specified mirror containing path intersect the reference plane along a smooth curve having a shape which is of essentially mathematically symmetric form with respect to at least one axis of the pair of orthogonal axes of symmetry in the reference plane; those mirror containing paths having the spaced control point positions of the first plurality of control point positions being projections onto the surface of the mirror array of smooth curves in the reference plane which are of symmetric form with respect to the first axis of symmetry and those mirror containing paths having spaced control point positions of the second plurality of control point positions being projections onto the surface of the mirror array of smooth curves in the reference plane which are of symmetric form with respect to the second axis of symmetry.

3. The radiation concentrator of claim 1, wherein:
   (a) the extended coupling means includes a first plurality of electrically resistive coupling devices, each extending between spaced control point positions of the first plurality of control point positions, and a second plurality of electrically resistive coupling devices, each extending between spaced control point positions of the second plurality of control point positions, and
(b) the control variable coupled by the electrically resistive coupling devices is an electrical voltage.

4. The radiation concentrator of claim 3, further comprising a plurality of electro-optical sensors for monitoring the direction of reflected beams from selected individual mirrors and providing corrective feedback for the voltage coupling means, the electro-optical sensor for monitoring an individual mirror having an optic axis directed toward the radiation receiver and including a first sensing means, symmetrically positioned with respect to the optic axis, for monitoring the tilt angle component about the first axis of resolution, and a second sensing means, symmetrically positioned with respect to the optic axis, for monitoring the tilt angle component about the second axis of resolution, with the first and second sensing means being individually rotationally adjustable about the optic axis, whereby the electro-optical sensor may be optimally adjusted for use at a particular position in the mirror array.

5. The radiation concentrator of claim 3, wherein the orthogonal mirror mount axes for each mirror are fixed axes which are identical to the local fixed axes of resolution for that mirror position.

6. The radiation concentrator of claim 5, wherein the extended coupling means includes both elastic coupling means for controlling the individual mirrors and electrical resistive coupling means for long range control of the elastic coupling means.

7. The radiation concentrator of claim 5, wherein the means for establishing angular orientations about the fixed orthogonal axes of resolution at each mirror position includes a first servomechanical actuator for varying the tilt angle component of the mirror about the first axis of resolution and a second servomechanical actuator for varying the tilt angle component of the mirror about the second axis of resolution, with the first and second servomechanical actuators being respectively coupled to individual position sensing potentiometers for establishing actuator configurations corresponding to the voltage values furnished to the mirror position by particular resistive coupling devices of the first and second pluralities of coupling devices.

8. The radiation concentrator of claim 3, wherein:
(a) the orthogonal mirror mount axes for each mirror comprise:
  (1) a fixed first mirror mount axis which is orthogonal to both axes of resolution for the mirror position, and
  (2) a second axis, orthogonal to the fixed axis and rotatable about the fixed axis, and
(b) the means for establishing angular orientations about the orthogonal mirror mount axes includes:
  (1) first and second actuator means for rotating the mirror about the first and second mirror mount axes respectively, and
  (2) transformation means for transforming, in combination, the coupled analog voltage values, which represent the tilt angle components about the fixed axes of resolution, into data usable for controlling the actuators associated with the first and second mirror mount axes.

9. The radiation concentrator of claim 2, wherein one of the axes of symmetry in the reference plane is aligned in the north-south direction.

10. The radiation concentrator of claim 2, wherein the reference plane is horizontal.

11. The radiation concentrator of claim 2, wherein the mirror array is distributed over a plane surface which is identical to the reference plane.

12. The radiation concentrator of claim 1, wherein the orthogonal mirror mount axes for each mirror are fixed axes which are identical to the fixed axes of resolution for each particular mirror position.

13. The radiation concentrator of claim 12, wherein the specified mirror containing paths are generally linear paths which intersect to form a pattern comprised of mirror containing rows and mirror containing columns.

14. The radiation concentrator of claim 13, wherein:
(a) the means for establishing angular orientations about the fixed orthogonal axes of resolution at each mirror position includes:
  (1) a first linear actuator, pivoted about one end, for controlling the first tilt angle component $\beta$, and
  (2) a second linear actuator, pivoted about one end, for controlling the second tilt angle component $\gamma$,
(b) the first control function is $(A_1 \pm \sin(\beta \mp \epsilon_1))^{\frac{1}{2}}$, where $A_1$ and $\epsilon_1$ are constants and the choice of positive or negative signs is determined by the location of the first linear actuator relative to the mirror position, and
(c) the second control function is $(A_2 \pm \sin(\gamma \mp \epsilon_2))^{\frac{1}{2}}$, where $A_2$ and $\epsilon_2$ are constants and the choice of positive or negative signs is determined by the location of the second linear actuator relative to the mirror position.

15. The radiation concentrator of claim 12, wherein:
(a) the extended coupling means includes a first plurality of tensile elastic coupling devices, each extending between spaced control point positions of the first plurality of control point positions, and a second plurality of tensile elastic coupling devices, each extending between spaced control point positions of the second plurality of control point positions, and
(b) the control variable coupled by the tensile elastic coupling devices is a mechanical displacement.

16. The radiation concentrator of claim 15, wherein the means for establishing angular orientations about the fixed orthogonal axes of resolution at each mirror position includes a first passive actuator for varying the tilt angle component of the mirror about the first fixed axis of resolution and a second passive actuator for varying the tilt angle component of the mirror about the second fixed axis of resolution, the first and second passive actuators for each mirror being coupled to, and actuated by, particular tensile elastic coupling devices of the first plurality and of the second plurality of coupling devices respectively.

17. The radiation concentrator of claim 15, wherein the means for establishing angular orientations about the fixed orthogonal axes of resolution at each mirror position includes:
(a) a first actuator having a first external energy input, for varying the tilt angle component of the mirror about the first axis of resolution, and a second actuator having a second external energy input for varying the tilt angle component of the mirror about a second axis of resolution, and
(b) a first control transducer for controlling the first external energy input and a second control transducer for controlling the second external energy input, the first and the second control transducers being coupled to, and actuated by, particular tensile elastic coupling devices of the first plurality and of the second plurality of coupling devices respectively.

18. The radiation concentrator of claim 15, wherein each tensile elastic coupling device comprises:
   (a) a belt containing many individual layers of a high strength elastic material, and
   (b) means for fastening arbitrary numbers of additional layers of the high strength material to the belt over individual intervals, whereby the coupling device may be given a desired gradation of compliance.

19. The radiation concentrator of claim 13, wherein:
   (a) the first control function is $\beta$, the tilt angle component about the first fixed axis of resolution,
   (b) the second control function is $\gamma$, the tilt angle component about the second fixed axis of resolution,
   (c) the extended coupling means comprises:
      (1) a first plurality of spaced apart parallel torsional elastic coupling devices, and
      (2) a second plurality of spaced apart torsional elastic coupling devices oriented perpendicularly to the first plurality of torsional elastic coupling devices,
   (d) the first and second pluralities of torsional elastic coupling devices also comprise, in combination, a collective mounting structure for the mirrors,
   (e) each mirror is segmented, with the individual mirror segments separated to avoid interference with the torsional elastic coupling devices.

20. The radiation concentrator of claim 12, wherein:
   (a) the means for establishing angular orientations about the fixed orthogonal axes of resolution at each mirror position includes:
      (1) a first fixed linear actuator for controlling the first tilt angle component $\beta$, and
      (2) a second fixed linear actuator for controlling the second tilt angle component $\gamma$,
   (b) the first control function is $\tan \beta$,
   (c) the second control function is $\tan \gamma$.

21. The radiation concentrator of claim 12, wherein:
   (a) the specified mirror containing paths are generally circular paths, and
   (b) the first and second control functions are $\tan \beta$ and $\tan \gamma$ respectively.

22. A mirror mount adapted for carrying a mirror in an array of collectively controlled mirrors, the mount allowing independent variations of angular orientation of the mounted mirror about a first and a second mutually orthogonal fixed mirror mount axes which are to be respectively oriented parallel for all mirror mounts in the collectively controlled mirror array, the mount comprising:
   (a) a support pedestal,
   (b) an articulated support joint including a fixed member which is rigidly coupled to the support pedestal and a mobile member which can be tilted through a wide range of angular positions about a fixed center of rotation,
   (c) a ring bearing having a first part which is rigidly coupled to the mobile member of the support joint and a second part which is rotatable with respect to the first part about an axis which passes through the center of rotation of the support joint,
   (d) a tiltable structure assembly having a first part and a second part; the mobile member of the support joint and the first part of the ring bearing being included in the first part of the tiltable structure assembly, and the second part of the tiltable structure assembly being carried by the second part of the ring bearing,
   (e) a first control linkage and a second control linkage,
   (f) a first articulated linkage joint for coupling the first control linkage to the first part of the tiltable structure assembly, and a second articulated linkage joint for coupling the second control linkage to the second part of the tiltable structure assembly, the first and second linkage joints being carried by the first and second parts of the tiltable structure assembly respectively within a common tiltable plane which is orthogonal to the axis of rotation of the ring bearing and contains the center of rotation of the support joint, and
   (g) a first actuator for moving the first control linkage and a second actuator for moving the second control linkage, the first and second actuators being so positioned with respect to the pedestal as to be adapted to move the first and the second control linkages respectively in a manner such that the first and the second articulated linkage joints are respectively constrained to move in a first and a second mutually orthogonal fixed planes which intersect along a line containing the center of rotation of the support joint; the normal directions to the first and second fixed planes respectively defining the directions of the first and second mirror mount axes.

23. The mirror mount of claim 22, wherein the articulated support joint is a ball and socket joint.

24. The mirror mount of claim 22, wherein each actuator is a linear actuator adapted to move the particular associated control linkage in a fixed direction which is orthogonal to both mirror mount axes, with each part of the tiltable structure assembly including an individual slide arm which is directed radially away from the center of rotation of the support joint in a plane which is perpendicular to the axis of rotation of the ring bearing, and with each articulated linkage joint being adapted to slidably engage one of the radially directed slide arms.

25. The mirror mount of claim 22, wherein each actuator is a linear actuator which is pivoted about one end, with each acutator adapted to control the linear distance between the pivoted end and the control linkage joint associated with that actuator, each control linkage joint being carried within the tiltable structure assembly at a fixed distance from the center of rotation of the support joint.

26. A solar radiation collector having a radiation receiver and a torsionally coupled mirro array disposed over a generally plane surface for concentrating solar radiation onto the radiation receiver, the collector comprising:
   (a) a plurality of spaced apart parallel torsional coupling devices of a first type, each having associated therewith an axis of rotation and a preselected gradation of torsional compliance between a first end of low compliance and a second end of high compliance,
   (b) a multiplicity of articulated mirror mount hubs, with a plurality of mirror mount hubs carried in spaced relationship by each torsional coupling device of the first type, each mirror mount hub comprising:

(i) a ring bearing having a first part which is rigidly coupled to the associated individual torsional coupling device of the first type which carries it, and a second part which is rotatable with respect to the first part about an axis of rotation which perpendicularly intersects the axis of rotation of the associated torsional coupling device of the first type, (ii) a primary pivot member, carried by the second part of the ring bearing, having an axis of rotation which perpendicularly intersects the axis of rotation of the ring bearing at the common point of intersection with the axis of rotation of the associated torsional coupling device of the first type, (c) a plurality of spaced apart parallel torsional coupling devices of a second type, each having a preselected gradation of compliance generally comparable to that of the individual coupling devices of the first type, such that each has a low compliance end and a high compliance end; with each torsional coupling device of the second type perpendicularly intersecting the plurality of coupling devices of the first type within the surface of the mirror array and being pivotally engaged to the primary pivot member of a mirror mount hub at each intersection of the individual torsional coupling device of the second type with the plurality of torsional coupling devices of the first type, (d) a plurality of mirrors, each carried by the second part of the ring bearing on a mirror mount hub and being so constructed as to avoid interference with the individual torsional coupling devices of the first and second types which intersect at the mirror mount hub, (e) means for supporting the ends of the torsional coupling devices, (f) means for estalishing desired rotational orientations for the ends of the individual torsional coupling devices, and (g) a radiation receiver which is spaced from the surface of the torsionally coupled mirror array and has dimensions small compared to the dimensions of the mirror array.

27. The solar collector of claim 26, wherein each mirror is a segmented mirror having four generally coplanar segments, with the segments separated to allow clearance for the torsional coupling devices which control the orientation of the mirror.

28. The solar radiation collector of claim 26, wherein the mirror array is generally rectangular in shape, with the corresponding end points for the pluralities of torsional coupling devices of the first and second types respectively lying along the intersections of the respective torsional coupling devices with individual planes which are perpendicular to the axes of rotation of the respective torsional coupling devices.

29. The solar collector of claim 28, wherein the means for establishing the desired rotational orientation for the ends of the torsional coupling devices are approximate means comprising:

(a) a plurality of pairs of bendable beams, one pair of bendable beams extending along each locus of corresponding end points for the first and second types of torsional coupling devices, (b) mechanical linkage means for relating the rotational orientation of the ends of each torsional coupling device to the local spacing between the pair of bendable beams associated with the particular locus of end points, and (c) means for establishing a spacing between each pair of beams at a plurality of points along the pair, with the number of points at which specific spacing is established for each pair of bendable beams being generally small compared to the number of torsional coupling devices linked to the pair of bendable beams.

30. The solar collector of claim 29, wherein the means for establishing the spacing between each pair of bendable beams includes:

(a) means for monitoring the rotational orientation of the ends of a selected plurality of torsional coupling devices, (b) actuator means for altering the spacing between the particular bendable beam pair nearby each monitored torsional device end point, and (c) means for sequentially energizing the acutator means to cyclically adjust the local beam spacing near each monitored end point so as to cyclically bring each monitored end point to a desired rotational orientation.

31. The solar collector of claim 26, wherein, in a non-vertical array, the torsionally coupled mirror array is allowed to sag slightly in a single direction along which one of the types of torsional coupling devices extends, thereby eliminating the need for special supportive structure over the area of the mirror array, with the rotational orientations of the ends of the torsional coupling devices being established appropriately for the particular sagging configuration.

32. The solar collector of claim 26, wherein the mirror array is sloped downward toward the equator at a substantial angle.

33. The solar collector of claim 26, further comprising a transparent covering disposed between the torsionally coupled mirror array and the radiation receiver.

34. The solar collector of claim 33, further comprising:

(a) a large area radiation absorber disposed on the opposite side of the mirrors from the central radiation receiver, and (b) means for transporting thermal energy from the large area radiation absorber to a use region.

35. The radiation collector of claim 34, wherein:

(a) each mirror is made reflective on both its front and back surfaces, and (b) the means for establishing the desired rotational orientations for the end points of the torsional coupling devices is capable of establishing an alternative, nonfocusing, set of rotational orientations characterized by:

(1) all torsional coupling devices of the first type being oriented so that the axes of the ring bearings are tangent to the surface of the mirror array, and (2) all torsional coupling devices of the second type being oriented so that the plane of each mirror is generally perpendicular to the surface of the mirror array, whereby the maximum amount of diffuse solar radiation can reach the large area radiation absorber during overcast periods.

* * * * *

UNITED STATES PATENT AND TRADEMARK OFFICE
CERTIFICATE OF CORRECTION

PATENT NO. : 4,172,443
DATED : Oct. 30, 1979
INVENTOR(S) : Warren T. Sommer

It is certified that error appears in the above-identified patent and that said Letters Patent are hereby corrected as shown below:

Column 6, line 14, "cars" should read --care--.
Column 10, line 67, "conventional" should read --unconventional--.
Column 13, line 37, "tan $\beta$ =" should read --tan $\gamma$ =--.
Column 17, line 28, "proportional which is approximately to" should read --which is approximately proportional to--.
Column 19, line 46, "$(A_2 \pm \sin(\beta \mp \epsilon_2))^{1/2}$" should read --$(A_2 \pm \sin(\gamma \mp \epsilon_2))^{1/2}$--.
Column 26, line 21, "carried" should read --caused--.
Column 29, line 22, "vibration" should read -- variation --.
Column 32, line 4, "tubular 178" should read --tubular member 178--.
Column 32, line 48, "pulley 198" should read --pulleys 198--.
Column 36, line 40, "the $\gamma$ sensitive sensing element" should read --the $\beta$ sensitive sensing element--.
Column 43, line 8, "$(1 - \cos\pi l_m 2L)$" should read --$(1 - \cos\pi l_m/2L)$--.
Claim 26, column 56, line 54, "mirro" should read --mirror--.
Claim 26, column 57, line 38, "estalishing" should read --establishing--.

Signed and Sealed this

Nineteenth Day of February 1980

[SEAL]

Attest:

SIDNEY A. DIAMOND

Attesting Officer    Commissioner of Patents and Trademarks